United States Patent [19]

Uehara et al.

[11] Patent Number: 4,961,859
[45] Date of Patent: Oct. 9, 1990

[54] METHOD OF TREATING AN AQUEOUS PROCESSING WASTE SOLUTION OF A NON-SILVER HALIDE LIGHT-SENSITIVE MATERIAL AND A DEVICE THEREFOR

[75] Inventors: Masafumi Uehara; Akira Nogami; Kazuhiro Shimura; Keiichi Yumiki; Akio Iwaki, all of Hino, Japan

[73] Assignee: Konica Corporation, Tokyo, Japan

[21] Appl. No.: 304,805

[22] Filed: Jan. 31, 1989

[30] Foreign Application Priority Data

Aug. 31, 1988 [JP] Japan ................................. 63-217404
Aug. 31, 1988 [JP] Japan ................................. 63-217405

[51] Int. Cl.$^5$ ............................................. B01D 1/00
[52] U.S. Cl. ..................... 210/725; 210/724; 210/727; 210/734; 210/737; 210/774; 210/803; 210/178; 210/182; 210/207; 210/787; 159/47.3; 203/14
[58] Field of Search ................. 159/47.3, 42; 210/725, 210/774, 776, 737, 175, 179, 182, 781, 702, 723, 724, 733, 734, 198.1, 787, 207, 178, 727, 783, 803; 203/14; 430/309; 354/324

[56] References Cited

U.S. PATENT DOCUMENTS

| 4,115,188 | 9/1978 | O'Brien et al. | 210/724 |
| 4,173,532 | 11/1979 | Keoteklian | 210/725 |
| 4,640,769 | 2/1987 | Wemhoff | 210/180 |
| 4,670,158 | 6/1987 | Kelly | 210/725 |
| 4,724,044 | 2/1988 | Weishaar et al. | 159/47.3 |
| 4,791,444 | 12/1988 | Fujimoto et al. | 354/324 |

FOREIGN PATENT DOCUMENTS

| 272883 | 6/1988 | European Pat. Off. | |
| 62-184457 | 12/1987 | Japan | 159/47.3 |

OTHER PUBLICATIONS

"Euromatic Balls" Product Information Pamphlet, Techne Incorporated, Jun. 22, 1977.
Patent Abstracts of Japan, vol. 11, No. 335 (P-632) [2782], Nov. 4, 1987, JPA-62-118,346; 5/29/87.
Patent Abstracts of Japan vol. 12 No. 398 (C-538) [3245] Oct. 21, 1988 JPA-63-141,692; 6/14/88.

Primary Examiner—Peter Hruskoci
Assistant Examiner—Krisanne Shideler
Attorney, Agent, or Firm—Jordan B. Bierman

[57] ABSTRACT

A method and a device of dividing an aqueous processing waste solution of a non-silver halide light-sensitive material into solid and water are disclosed comprising the steps of:
(a) introducing said solution into an evaporator,
(b) concentrating by heating said solution,
(c) removing sludge produced from the evaporator during concentrating by heating said solution,
(d) separating the sludge into solid and liquid and
(e) cooling and condensing evaporated gas to liquid.

27 Claims, 14 Drawing Sheets

METHOD OF TREATING AN AQUEOUS PROCESSING WASTE SOLUTION OF A NON-SILVER HALIDE LIGHT-SENSITIVE MATERIAL AND A DEVICE THEREFOR

FIELD OF THE INVENTION

The present invention relates to method of treating an aqueous processing water solution (hereinafter called "the waste") produced during processing, using an automatic developing machine, of a light-sensitive material whose solubility in developers changes due to light irradiation, and more specifically to a method of treating the waste occurring when processing, with an automatic developing machine, a light-sensitive material having, on a support, a non-silber halide image forming layer whose solubility in developers changes due to light irradiation, examples of the light-sensitive material including lithographic, intaglio, and relief printing materials, as well as materials for color proof.

BACKGROUND OF THE INVENTION

In the conventional methods of developing light-sensitive materials, there are typically such a disposing method that the waste is taken over by traders for the recovery of waste materials or a waste solution disposal facility for treating the waste is built with large investment, which leads to problems in cost and space for the disposal of the waste.

Especially, for the purpose of making the process of the waste produced during treatment of silver halide photographic materials easy, a device for the evaporation to dryness of the waste by heating to evaporate water is disclosed in Japanese Utility Model Publication Open to Public Inspection No. 70841/1985 (Hereinafter referred to as Japanese Utility Model O.P.I. Publication), however, because the waste is directly condensed or evaporated to dryness and, particularly, when the processing waste solution of non-silver halide light-sensitive materials include a lot of high molecular ingredients, solid matter (including sludge) will stick to the wall in an evaporation vessel or to a heat source. This result in lower efficiency in evaporation process, troublesome maintenance for eliminating the solid matter or sludge, and difficulty in removing the sludge.

SUMMARY OF THE INVENTION

The first purpose of the invention is to provide a method and a device for treating the waste which can save the space needed to process the waste of a non-silver halide light-sensitive materials.

The second purpose of the invention is to provide a treating method and treating device which improves the working efficiency for treating the waste of non-silver halide light-sensitive materials. Thirdly the purpose is to provide a method and a device which can stably carry out the heating and condensing processes of the waste of non-silver light-sensitive materials for a long time. And the fourth purpose is to provide a method and a device improved so as not to cause troubles due to the adherence of adhesive sludge to the evaporator during heating and condensing.

In the conventional methods of developing light-sensitive materials, typically disposing methods include the removal to the waste by traders for the recovery of waste materials or a waste water disposal facility for treating the waste is built is built with large investment, which leads to problems in cost and space for the disposal of the waste.

A few methods for separating the waste of light-sensitive materials into water and solid matters (or sludge) by heating and condensing the waste. However, because non-silver halide light-sensitive material solutions in particular, include a lot of high molecular ingredients, adhesive sludge will stick to a heating member or an evaporation vessel during the heating an condensing process, which results in an unstable heating process, and difficulty in removing sludge using the conventional method.

The fifth purpose is to provide a method capable of saving cost in treating the waste of non-silver halide light-sensitive materials.

DETAILED DESCRIPTION OF THE INVENTION

The purposes of the invention are achieved by providing a method and a device of dividing an aqueous processing waste solution of a non-silver halide light-sensitive material into solid and water comprising the steps of:

(a) introducing said solution into an evaporator,
(b) concentrating by heating said solution,
(c) removing from the evaporator sludge produced during concentrating by heating said solution,
(d) separating the sludge into solid and liquid and
(e) cooling and condensing evaporated gas to liquid.

The purposes of the invention are also achieved by providing a treating method for the process of non-silver halid light-sensitive materials, wherein the sludge produced in the evaporator during heating and condensing is discharged from an upper surface of the waste and/or the evaporater beneath, and by a treating device for the waste of non-silver halide light-sensitive materials, comprising an evaporator for heating and condensing the process waste and a means of discharging the sludge produced in the evaporator at an upper surface of the waste and the beneath of the evaporator.

The purposes of the present invention are also achieved by providing a method of treating the waste of non-silver halide light-sensitive materials comprising a heating and condensing process and a chemical treatment process, wherein the waste of non-silver halide light-sensitive materials is separated into solid ingredients and water, and by providing a device for separating the waste into solid ingredients and water comprising a means of performing chemical treatment on the waste, and a means for heating and condensing the waste.

The above purposes of the present invention are established by providing a method of processing the waste of non-silver halide light-sensitive materials, wherein the waste of non-silver halide light-sensitive materials is separated into solid ingredients and water by discharging the sludge produced in the evaporator at upper surface of the waste, and by a device for treating the waste of non-silver halide light-sensitive materials comprising an evaporator for heating and condensing the waste and a discharging means located at the upper surface of the waste of the evaporator, wherein the waste of non-silver halide light-sensitive materials is separated into solid ingredients and water.

The invention will be described in detail below.

The non-silver halide light-sensitive material comprise a support having coated thereon a light-sensitive layer changing the solubility of which is changed by irradiation of an actinic light or a layer capable of obtaining an image resist by an electro photographic method described in Japanese Patent Publication Open to Public Inspection (hereinafter referred to as Japanese Patent O.P.I. Publication) No. 210347/1982.

Supports used for a presensitized lithographic printing plate (hereinafter referred to as PS Plate) which is one example of non-silver halide light-sensitive materials are paper, plastics (e.g. polyethylene, polypropylene, and polystyrene), laminate paper, metal plates such as aluminum (including aluminum alloy), zinc, and copper, plastics films such as cellulose diacetate, cellulose triacetate, cellulose propionate, polyethylene terephthalate, polyethylene, polypropylene, polycarbonate, and polyvinyl acetal, paper or plastics films laminated or deposited the above metals, and steel sheet plated with aluminum or chrome. Among these aluminum and a complex support coated with aluminum in particular are preferable.

Also, the surface of aluminum is preferably roughened for the purpose of improving water retentivity and adhesion to light-sensitive layers.

Methods of roughening include generally known brushing, balling, electrochemical etching, chemical etching, liquid honing, and sand blasting or their combinations, and brushing, electrochemical etching, chemical etching, and liquid honing are preferable and roughening with electrochemical etching is more preferable.

For electrolytic bath used in electrochemical etching, an aqueous solution containing acid, alkali, or their salts or an aqueous solution containing organic solvent are used and electrochemical solutions containing hydrochloric acid, nitric acid, or their salts are especially preferable.

An aluminum plate roughened is subjected to a desmut treatment in acid or alkali solutions if required.

The aluminum plate thus obtained is preferably subjected to anodic oxidation treatment, more preferably, in a bath containing sulfuric acid or phosphoric acid.

Sealing, or surface treatment by soaking in an aqueous potassium zirconate fluoride solution may be carried out if necessary.

The light-sensitive compositions of non-silver halide light-sensitive materials used in the invention include light-sensitive materials and further, more preferably, high molecular compounds.

Materials whose physical or chemical properties are changed by exposure or subsequent developing, for example, a material whose solubility to developing solution changes by exposure, a material whose adhesion between molecules changes by exposure, a material whose affinity to water or oil changes by exposure or subsequent developing, and a material on which an imaging portion can be formed using an electrophotographic method can be used as light-sensitive materials.

The representative light-sensitive materials include, for example, a light-sensitive diazo compound, a light-sensitive azide compound, a compound having an ethylenic unsaturated double bond, an epoxy compound which polymerizes with acid catalysts, and the combinations of a compound capable of generating an acid by action of light and a silyl ether polymer or a compound having C—O—C group decomposed with an acid.

The light-sensitive diazo compounds include o-quinone diazide compounds such as a positive type which changes to be soluble to alkaline solution by exposure, and aromatic diazonium salts as a negative type whose solubility decreases by exposure. Examples of o-quinone diazide compounds are disclosed in Japanese Patent O.P.I. publications No. 5303/1972, No. 02/1973, No. 63803/1973, No. 38701/1974, No. 1044/1981, No. 1045/1981, Japanese Patent Examined Publications No. 22/1966, No. 28403/1968, No. 9610/1970, and No. 81/1974, U.S. Pat. Nos. 2,797,213, 3,046,120, 3,188,210, 3,454,400, 3,544,323, 3,573,917, 3,674,495, 3,785,825, British Patent Nos. 1,227,602, 1,251,345 1,267,005, 1,329,888, 1,330,932, and German Patent No. 854,890.

The light-sensitive component of these compounds includes o-quinone diazide sulfonate or o-quinone diazide carboxylic acid ester with an aromatic hydroxy compounds, o-quinone diazide sulfonate or o-quinone diazide carboxylic acid ester with an aromatic amino compound. An o-quinone diazide compound alone or a mixture of the o-quinone diazide compund and an alkaline soluble resin is used for a light-sensitive layer.

Alkaline soluble resins include novolak type phenol resins, more specifically, phenol formaldehyde resins, cresol formaldehyde resins, phenol-cresol mixed formaldehyde resins, and cresol xylenol mixed formaldehyde resins.

As described in Japanese Patent O.P.I. Publication No. 125806/1975, with the above phenol resins, a phenol substituted for alkyl groups with 3–8 carbon atoms such as t-butyl phenol formaldehyde resins or a condensation product of cresol and formaldehyde can be applied. For light-sensitive layers whose light-sensitive ingredient is o-quinone diazide compounds, additives such as dyes, plasticizer, or materials which provides printing-out performance may be added.

The present invention can be applied to a positive type pre-sensitized lithographic printing plate having light-sensitive layers which contain these o-quinone diazide compounds as light-sensitive ingredients. For above-mentioned light-sensitive layers, high molecular compounds are generally used together with o-quinone diazide compounds. The present invention can be preferably applied to these light-sensitive layers.

The representative light-sensitive materials for negative type light-sensitive layers are diazo compounds including diazonium salts and/or diazo resins that are condensation products of p-diazo diphenyl amine and formaldehyde, phenol salt or fluorocaprylic acid salt of p-diazo diphenyl amine disclosed in Japanese Patent Examined Publication No. 7364/1977, diazo resins soluble in organic solvent of a copoly condensation product of -methoxy diphenyl amine-4-diazonium chrolide, 4-nitro diphenyl amine and formaldehyde, -methoxy-4-hydroxy-5-benzoyl benzene sulfonate of condensation product of p-diazo diphenyl amine and formaldehyde, tetrafluoroborate of a condensation of p-diazo diphenyl amine and formaldehyde, or hexafluorophosphate of a condensation of a p-diazo diphenly amine and formaldehyde.

The present invention can be applied to a negative type light-sensitive lithography printing plate including above light-sensitive materials.

The present invention also can be preferably applied when these diazo compounds are used alone or used with various mixed resins.

Such resins include shellac, polyvinyl alcohol derivative, copolymers having alcoholic hydroxy group on side chains as described in Japanese Patent O.P.I. Publication No. 118802/1975, and copolymers having phenol hydroxy group on side chains as described in Japanese Patent O.P.I. Publication No. 155355/1980.

These resins include copolymers which contain at least 50wt % of the structure unit shown by the following general formula:

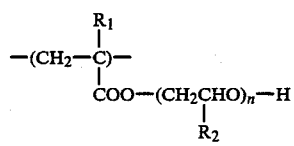

(where, $R_1$ denotes a hydrogen atom or methyl groups, $R_2$ denotes a hydrogen atom, methyl groups, ethyl groups, or chloromethyl groups, and n denotes an integer of 1 to 10.), and high molecular compounds having an acid number of 10–200 having 1–80 mol% of a monomer unit which has an aromatic hydroxy group and 5–90 mol% of acrylic ester and/or methacrylic acid ester monomer unit.

The light-sensitive layers of a negative type light-sensitive lithographic printing plate to which the present invention is applied can include dyes, plasticizers, and ingredients which provide printing-out performance.

The developer used in the treatment using the automatic developing device according to the present invention is preferably an aqueous alkaline developer, and alkaline agents used in the developer include an inorganic alkaline agent such as sodium silicate, potassium silicate, sodium hydroxide, lithium hydroxide, tertiary sodium phosphate, secondary sodium phosphate, tertiary potassium phosphate, secondary potassium phosphate, tertiary ammonium phosphate, secondary ammonium phosphate, sodium metasilicate, sodium bicarbonate, sodium carbonate, potassium carbonate, and ammonium carbonate, organic alkaline agents such as mono-, di-, or tri-ethanol amine and tetra-alkyl ammonium hydroxide, and ammonium silicate.

The content of the alkaline agent used in the developer is preferably 0.05–30% by weight and more preferably 0.1–20% by weight.

An organic solvent can be added to the developer used in the present invention. As organic solvents, ethylene glycol monophenyl ether, benzyl alcohol, and n-propyl alcohol can be used. The content of an organic solvent in the developer is preferably 0.5–15% by weight and more preferably 1–5% by weight.

As a surface active agents, an anionic active agent is preferably added to the developer. Anionic active agents include higher alcohol ($C_3$–$C_{22}$) sulfuric ester salts for example, sodium salts of lauryl alcohol sulfate, sodium salts of octyl alcohol sulfate, ammonium salts of lauryl alcohol sulfate, "Tee pol B-81" (a trademark of Shell Chemical Co., Ltd.), secondary sodium alkyl sulfate, aliphatic alcohol phosphoric ester salts (for example, sodium salts of cetyl alcohol phosphoric ester), alkyl aryl sulfonates (for example, sodium salts of dodecyl benzene sulfonic acid, sodium salts of isopropyl naphthalene sulfonic acid, sodium salts of dinaphthalene disulfonic acid, sodium salts of methanitro benzene sulfonic acid), sulfonates of alkyl amide (for example,

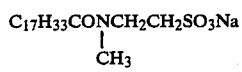

sulfonates of dibasic fatty acid ester (for example, sodium sulfosuccinic acid dioctyl ester, and sodium sulfo-succinic acid dihexyl ester). Especially sulfonates are preferably used among these salts.

The additives as shown below can be added to these developers in order to improve their developing performance. For example, neutral salts such as NaCl, Kcl and KBr described in Japanese Patent O.P.I. Publication No. 75152/1983, chelating agent such as EDTA and NTA described in Japanese Patent O.P.I. Publication No. 190952/1983, complexes such as $[Co(NH_3)_6]Cl_3$, and $CoCl_2.H_2O$ as described in Japanese Patent O.P.I. Publication No. 121336/1984, anionic or amphoteric surface-active agent such as sodium alkyl naphthalene sodium sulfonate, N-tetradecyl-N,N-dihydroxy ethyl betaine described in Japanese Patent O.P.I. Publication No. 51324/1980, nonionic surface active agents such as tetramethyl decin diol described in U.S. Pat. No. 4,374,920, cationic polymers such as methyl chloride quaternary compounds of p-methyl aminomethyl polystyrene described in Japanese Patent O.P.I. Publication No. 95946/1980, amphoteric high molecular electrolyte, such a a copolymer of vinylbenzyl trimethyl ammonium chloride and sodium acrylate described in Japanese Patent O.P.I. Publication No. 142528/1981, reducing inorganic salts such as sodium sulfite described in Japanese Patent O.P.I. Publication No. 19295/1982, inorganic lithium compounds such as lithium chloride described in Japanese Patent O.P.I. Publication No. 59444/1983, organic lithium compounds such as lithium benzoate described in Japanese Patent Examined Publication No. 34442/1980, organic metal surface agents including Si and Ti described in Japanese Patent O.P.I. Publication No. 75255/1984, organic boron compounds described in Japanese Patent O.P.I. Publication No. 84241/1984, quaternary ammonium salts such as tetraalkyl ammonium oxide, organic solvents such as benzyl alcohol, ethylene glycol monophenyl ether described in European Patent No. 101,010.

The waste to be treated in the present invention includes the developer (eluate) or washing water of the above-mentioned non-silver halide light-sensitive materials, or gumm solution, rinsing water or finisher for negative and positive type pre-sensitized light-sensitive lithographic printing plate.

When two or more kinds of the waste should be treated according to the invention, it is preferable to treat them together for better working efficiency.

Next, a means of treating the waste to separate it into a solid material and water is described.

In the invention, sludge means a mixture of solid and liquid ingredients produced during concentrating the waste by heating or by chemical treament prior to heating. Solid ingredients mean residues produced by removing liquid from sludge with separating operation.

A device as an embodiment of the present invention is, for example, constructed shown as the schematic view of FIG. 1.

A waste tank 11 containing the waste discharged from a processor device for non-silver halide light-sensitive materials has a pump $P_1$ and a filter $F_1$ connected in series at the inlet 119 of the cylindrical portion 111 of an evaporator 110 with piping. Also, overflow solution is collected through a silicon tube into the waste tank 11 from an overflow outlet 118 located at the cone-shaped wall 112 of the evaporator 110. A level gauge 15 is provided at the tank 11 to detect liquid quantity.

An evaporator 110 comprising container with the cylindrical portion 111, the cone-shaped wall 112, and a liquid reservoir 126 having lower constricted part 125 and a pipe located from a lower sludge outlet 114 to the sludge faucet 131 of a sludge separator 130, and is connected to a lower sludge tank 140 with the connection 135 at the lower part of said sludge separator 130.

A liquid circulating device 145 is connected with piping to the evaporator 110, the sludge separator 130, and the sludge tank 140 so that circulation can be done by returning the liquid through a pump $P_2$. 142 denotes a pressure adjusting valve.

A heating member 115 or mesh members 116, 117 filled with semiconductors of sintered materials which generate heat and ultrasonic waves by current are supplied in the evaporator 110. Either mesh member can be used. A level gauge 122 is also provided.

The gas evaporated from the waste goes through an outlet 113, a heat exchanger 172, and a cooler 152 connected at the lower part of an absorption tank 162 and condensed liquid (water) is led from an outlet 165 to a collecting container 168 through the filter $F_2$.

A circulating unit 170 which promotes the circulation of non-condensable gas, circulates flow partly through the heat exchanger 172 to the evaporator 110, and feeds condensed liquid to a collecting container 168 connected with piping from the upper portion to the lower portion of the absorption tank.

It is preferable to provide mesh members 116 and/or 117 in the passage near the outlet for the evaporated gas led to the outlet inside the evaporator 110.

These mesh members can prevent the waste splashed from the waste surface from discharging with evaporated gas from the outlet.

The mesh size of the mesh members 116, 117 is preferably 0.5-1.3 mm. More specifically, a 0.2 mm in diameter, a 1.0 mm pitch stainless steel wire gauge can be used. The mesh member is preferably double located as shown in the figure to obtain the complete effect mentioned above.

As a preferred embodiment, the outlet 113 for evaporated gas is located at the center of the upper end of the cone-shaped wall 112 and the outlet 114 for sludge at the lower end in the evaporator 110. In such an embodiment, it is preferable that the inner walls between the cylindrical portion 111 of the evaporator 110 and the outlet 113 for evaporated gas have an angle of 20-40 degrees to the vertical direction because the waste adhering on the inner walls which splashed from the waste surface during evaporating can be easily flown down.

A level gauge 122 is preferably provided inside the evaporator 110. By providing a device to control the pump $P_1$ which supplies the waste depending on the results detected with the level gage so as to keep the constant level of the waste inside the evaporator, supplying the waste into the evaporator 110 becomes easier.

The volume of the portion into which the waste is put depends on the heating member, however, 1-10 liters for a supplying power of 1 Kw is preferable and 1.5-5 liters more preferable. The volume of the upper space to prevent bubbles' from flowing-out and bumping is preferably 0.5-4 times as large as the volume of the waste containing portion, more preferably, 0.7-2.5 times.

In a device shown in FIG. 1, a sludge separator 130 is a device which separates sludge produced in the evaporator 110 during the process of the waste from the evaporator 110 and collects the sludge, and it is preferable that a sludge tank 140 is detachably connected at the upper portion, the sludge tank 140, the evaporator 110 and/or the sludge separator 130 are connected with piping, and a liquid circulating device 145 which circulates the liquid inside the sludge separator 130 so as to flow it from the sludge separator 130 to the sludge tank 140 through said connection 135 is preferably equipped. By equipping the liquid circulating device 145, the working efficiency of discharging sludge is improved.

As shown in FIG. 13, the process waste including sludge may be separated into solid ingredients and water using a filter 180 so that solid ingredients can be removed out by opening a cap 181.

The numbers shown in FIG. 1 also denote the same parts in FIG. 13.

When the waste treated with the evaporator contains dispersed materials of high molecular compounds, it is preferable to remove these materials by filter $F_1$ before putting them into the evaporator. By adding such a waste treating process, the solid ingredients produced from the waste by a heat of the heating member in the evaporator do not become sticky and dry solid ingredients which are easily handled can be produced.

By adding a device 150 treating an evaporated gas to the evaporator 110, harmful gases (for example, ammonia gas, sulfur dioxide gas, and gases of various organic solvents) contained in the evaporated gas can be eliminated for great affect.

The vapor gas treating device 150 has a cooler 152, an absorption tank 162, the outlet 113 and the cooler 152 for evaporated gas from the evaporator 110, and pipes connecting the cooler 152 and the absorption tank 162, and the absorption tank 162 has an absorption agent container 64 inside and a tube unit 171 at the lower end which circulates non condensed gases from the upper to the lower part of the outlet 165 for condensed liquid and the absorption tank 162.

As a cooling means in the cooler 152, for example, a unit in which many internal thin tubes containing cooling water may be used.

The absorption tank 162 may be generally shaped as a vertical and tubular shell and an absorption agent such as activated carbon can be selected according to the purposes and so on. Though the size of the absorption container 164 may be selected based on the quantity of treating the waste or the types of the waste, a standard size is preferably 20-100 mm in inner diameter, 200-1000 mm in height when the process waste of the ordinary positive or negative type pre-sensitized printing plate developer is processed at a rate of 10 liters/24 hours.

A circulating pipe 173 for non-condensed gas as shown below is preferably added to the treating device 150 for evaporated gas.

According to the embodiment, the absorption of harmful gases contained in a non-condensed gas will be more effective.

The circulating unit 170 including above-mentioned tube unit 171 and the circulating unit 173 has a circulating piping 173 which presses and feeds non-condensed gases into the evaporator 110 and has a heat exchanger 172 which exchanges the heat between the non-condensed gas before entering into the evaporator 110 and evaporated gas discharged from the evaporator 110.

Also, the absorption tank 162 is preferably connected in the outlet for condensed liquid to the filtering unit $F_2$. By passing through the filtering unit $F_2$, the content of impurities in the condensed liquid can be further decreased.

A preferred embodiment of the heating member 115 used in the invention, as mentioned above, includes a member in which at least one part of 5–30 mm in inner diameter, 1–5 mm in thickness pipes made of materials (such as stainless steel) with anti-corrosion, heat resistance, and heat conduction whose inner walls are insulated and coated with silicone resins contains the sinter of semiconductor composition powder filled inside, and the semiconductor filling part is shaped (e.g. a coil-like shape in the liquid) so as to dip the required length in the waste. The both ends of the semiconductor member 115 are connected to the connector 123 located evaporator wall surfaces 112 or 124 above the waste to connect an external power supply. In this embodiment, the length of the semiconductor filling portion of the semiconductor member 115 in the waste is preferably 4–20 mm per waste treating capacity (g/minute).

Burned material semiconductors used in the invention which generates heat and supersonic waves by supplying power include burned materials of mixtures selected from oxidized metals or elements such as CuO, $Cu_2O$, ZnO, NiO, $Ni_2O_3$, CdO, BaO, $WO_2$, $WO_3$, $MoO_2$, $Yb_2O_3$, $Y_2O_3$, $Fe_2O_3$, $Fe_3O_4$, FeO, C, Si, Ga, Ge, Se, $TiO_2$, TiO, $Ti_2O_3$, CoO, $Co_2O_3$, $Co_3O_4$, $Al_2O_3$, CrO, P, As, $Cr_2O_3$, $CrO_3$, MnO, $MnO_2$, $Mn_2O_3$ and SiC. For adding conductivity or as a binding agent, the above oxidized metals or elements or other elements (Ag, Au, Pt, stc.) or $SiO_2$, $Na_2O$, $K_2O$, CaO, or MgO can be added.

A preferred embodiment includes the one having a composition as shown below.

The composition of 50–90% of $Fe_2O_3$, 2–3% of at least one selected from MnO, CoO, NiO, FeO, CuO, CdO, and ZnO and 2–30% of at least one selected from $Na_2O$, $K_2O$, $SiO_2$, CaO, and $Al_2O_3$ is preferable.

A preferred embodiment of treating the waste used in the invention include an embodiment, wherein a hollow pipe with anti-corrosion, heat-resistance, and heat conductivity whose inside is insulated and coated with silicon resins etc. is internally filled with particulate semiconductor mixtures, a burned material semiconductor heater produced by supplying power to burn the particulate materials the waste to be treated is dipped to the waste to be treated and heat and ultrasonic waves are generated by supplying power.

In this embodiment, the grain diameter of abovementioned particulate semiconductor mixture preferably 0.01–0.2 mm, and a stainless steel hollow pipe internally insulated with an inner diameter of 5–30 mm and a thickness of 1–5 mm in which particulate burned material semiconductors are filled so that the length of filling portion becomes 4–20 mm per the waste treating capacity (g/minute) can be used.

The water thus treated and separated contains 90% or more pure water.

In the methods according to the present invention, the waste is treated and separated into solid materials and water and the separated water can be used as at least a part of washing water, or water for dilection of at least one selected from concentrated developer, replenisher for developer, rinsing solution, gum solution and cleaning solution used for the process with the automatic developer. Thus water resource can be saved by recycling and circulating the useful ingredients (solvents) contained in the waste, enabling the waste ingredients to be greatly decreased. Furthermore, waterworks or drainage accompanying the installation of the automatic developing machine can be omitted.

Though embodiments for using separated water are not limited, when it is used as washing water it is advantageous in working efficiency that the collecting container for the water separated from the waste and the washing water tank inside the automatic developing machine are connected with piping. As preferred embodiment used as dilution water include an embodiment, wherein a dilution water tank for containing dilution water which is located in the automatic developing machine and a collecting container for water separated from the waste are connected with piping, and the water in the collecting container is automatically fed to the dilution water tank by controlling the liquid quantity of the dilution water tank.

The invention is described in detail hereinafter according to the attached drawings.

FIG. 2 is a cross-sectional view of a second embodiment of a treating device according to the invention. In this figure, 21 denotes a heating and condensing vessel, 22 denotes a discharging means for sludge located at the side comprising an opening 220, a pipe 221, a filtering unit 222, and a pump 223. The filtering unit 222 has a cap 224 in the side, enabling solid materials on a filter 225 to be cleaned out.

As shown in FIG. 14, sludge discharged from the upper surface of the waste may be stored. The numbers in FIG. 14 which are also shown in FIG. 2 denote the same. In FIG. 2, 23 denotes a heating unit, 25 denotes a level sensor which controls the height of solution level in a heating and condensing vessel 21, 26 denotes a pipe for feeding the process waste from the process waste tank 27 to the heating and condensing vessel 21, 28 denotes a pump, 29 denotes a condenser for cooling and condensing gases evaporated from the waste in the heating and condensing vessel 21, and 210 denotes a receiver for condensed liquid.

The heating and condensing vessel 21 is preferably a cylindrical metal vessel made of stainless steel having protective coat with fluoro-resins (such as Teflon), has an opening 20 provided in the side at the height of liquid level, and is connected to a pipe 221. The shape of the opening 220 may be circle or cylindrical and the opening area may be preferably 1.8–10 $cm^2$. A plurality of openings may be provided. As the filter 225 used for the filtering unit, a stainless steel mesh filter, or filters made of cloth, paper, or synthetic paper, are used and the shapes are freely selected as flat, cylindrical, and pleats-made, however a stainless mesh filter is preferable.

The heating unit 23 may use electric power, combustible gas (city gas) or other suitable heat sources.

Next, the method of the present invention is described according to the embodiment of the device.

First, the waste (such as overflow liquid) discharged from the treating device for light-sensitive materials is fed into the process waste tank 27. The waste is then send to the heating and condensing vessel 21 using the pump 28. At the time, the operation of the pump 28 is controlled so that the height of the liquid level in the heating and condensing vessel 21 becomes equal to the height at which sludge floating on the surface of the waste flows out from the opening 220. In this example shown in this figure, the height of the liquid level is controlled to be kept at a constant range with a level sensor 25 and a controller (not shown). The waste is treated with the heating unit 23 in the heating and condensing vessel 21. Gases evaporated from the surface of the waste is condensed with a condenser 29 to turn into liquid and is gathered in the receiver 210. On the other hand, the waste condensed produces sludge including resins etc. at the upper surface. The waste including the sludge is sent from the opening 220 to the filtering unit 222 and is separated into solid materials and liquid, the liquid is returned to the heating and condensing vessel 21, and the solid materials on the filter 225 is cleaned out by opening the cap 224. The filter may use centrifuging as shown in FIG. 3. In FIG. 3, 331a denotes a sludge installation pipe, 331b denotes a liquid discharging pipe, 332 denotes a motor, 333 denotes a pump, 340 denotes a centrifugal separator, 341 denotes a rotating member having many small openings, and 342 is a cloth bag.

According to the invention as described above, as the sludge floating the upper portion of the waste in the heating and condensing vessel is discharged when the treating unit is operating, the adhesion of sludge to the heating member, to the level sensor, and to the wall in the heating and condensing vessel is prevented and stable treatment of the waste can be attained continuously.

In the present invention, by floating adhesive sludge in the upper portion of the waste, said sludge is preferably discharged from the upper portion of the waste. The significant feature in treating non-silver halide light-sensitive materials is that sludge floats in the upper portion. Means of floating adhesive sludge include a means of forcing the waste to be circulated, a means of circulating at least one floating ball (such as polystyrene balls with a diameter of 5-10 mm) for adhesion, a means of floating sludge by blowing air from the bottom of the vessel, and a means of forcibly generating porous sludge with large grain size by chemical treatment.

In the invention, a preferred means of discharging sludge out of the heating and condensing vessel is a means of discharging located at the upper portion inside the heating and condensing vessel or outside the heating and condensing vessel. By using these means, the accumulation of sludge in the heating and condensing vessel can be suppressed, preventing sludge from adhering the heating member, level sensor, and the inside of the vessel.

In the invention, means of removing sludge from the upper portion in the heating and condensing vessel can be selected from; (1) a removing means by sticking sludge to a belt or a drum, and (2) a means in which at least one floating ball are put into the heating and condensing vessel and the floating balls to which sludge was stuck is discharged, and these are preferable in running performance and cost saving.

(1) and (2) are described hereinafter according to the drawings.

FIG. 4 represents an example view of device for removing sludge by sticking it to a drum. In this figure, 440 represents a drum and if it is rotated to the direction shown in the figure floating sludge will stick onto the peripheral wall surface and be removed from the liquid surface and sludge stuck on the peripheral wall surface is cleaned out in a blade 446 located at a sludge outlet 445, put into the inside of the filtering unit 441, and separated into solid materials and liquid and the liquid returns to a heating and condensing vessel 41 using the pump 443. 444 denotes a closing valve.

FIG. 5 represents a view of a unit of discharging sludge using at least one floating ball. In this figure, 550 denotes a container to contain floating balls 551, and 552 denotes a belt conveyor which carries the floating balls into a heating and condensing vessel 51. The floating balls 551 in a heating and condensing vessel 51 float on the surface of the waste, sticks to sludge (557), and enters into the filtering unit 554 from the opening 553 and solid materials and liquid are separated with the filter 555 and the liquid returns to the heating and condensing vessel 51 using a pump 556.

The third embodiment on the invention is described hereinafter according to the drawings.

FIG. 6 represents a cross-sectional view of a treating device according to the invention. In this figure, 61 denotes a heating and condensing vessel, 62 denotes a means discharging solid materials located at the side comprising an opening 620, a pipe 621, a filtering unit 622, and a pump 623. The filtering unit 622 has a cap 624 on the side, which enables solid materials on the filter 625 to be cleaned out. 63 represents a device of discharging solid materials located at the lower end of a heating and condensing vessel comprising an opening 630, a pipe 631, a filtering unit 632, and a pump 633. The filtering unit 632 has a cap 634 on the side, enabling solid materials on a filter 635 to be cleaned out. 64 denotes a heating unit, 65 denotes a level sensor which controls the height of the liquid level in the heating and condensing vessel 61, 66 denotes a pipe which feeds the waste from the process waste tank 67 to the heating and condensing vessel 61, 68 denotes a pump, 69 denotes a condenser which cools and condenses gases evaporated in the heating and condensing vessel 61, and 610 denotes a receiver for containing condensed liquid.

The heating and condensing vessel 61, the opening 620, the filter used for the filtering unit 622, and the heating and condensing vessel 64 can be preferably similar to those described in FIG. 2.

The opening 630 is located at the bottom or the lowest side of the heating and condensing vessel, shape is preferably circle, rectangular, etc., and the opening area is preferably 3-15 cm$^2$. A plurality of openings may be provided. The filter 635 to be used may be the same as the filtering unit 622.

The waste discharged from the treating device for light-sensitive materials (overflow liquid etc.) is put into the process waste tank 67. The process waste is sent from there to the heating and condensing vessels using the pump 68. Then the operation of the pump 68 is controlled so that the height of the liquid level in the heating and condensing vessel 61 can be equal to the height at which sludge floating on the liquid surface can flow out from the opening 620. In the example shown in the figure, the height of the liquid level is controlled to be kept within a constant range using a level sensor and a controller (not shown). The process waste is heated using the heating unit 64 in the heating and condensing vessel 61. The gas heated and evaporated from the waste surface is condensed using the condenser 69 to be liquid and is put into the receiver 610. On the other hand, the waste condensed produces sludge containing resins etc. in the liquid. The sludge which is floating on the liquid surface is sent with the waste from the opening 620 to the filtering unit 622, solid materials and liquid are separated using the filter 625 and the liquid is returned to the heating and condensing vessel 61, the solid materials on the filter 625 are cleaned out by opening the cap 624. On the other hand, sludge precipitated to the lower portion of the heating and condensing vessel is send with the process waste from the opening 630 to the filtering unit 632, solid materials and liquid are separated and the liquid is returned to the heating and condensing vessel 61. The filtering unit is, as shown in FIG. 3, may use centrifuging.

According to the invention as described above, the sludge is discharged from both the liquid surface of the waste in the heating and condensing vessel and the lower portion of the heating and condensing vessel when the treating unit is operating, preventing sludge containing much resin etc. from sticking to the heating member, to the level sensor, and the inside of the heating and condensing vessel, and enabling heating and condensing treatment of the process waste to be attained continuously.

In the present invention, inside the heating and condensing vessel or outside the heating and condensing vessel, along with providing a means of removing sludge floating around the upper portion of the process waste, liquid containing sludge precipitated is discharged from the bottom of the heating ad condensing vessel to separate solid materials and the liquid. Means of removing sludge from the upper portion of the liquid surface of the waste in the heating and condensing vessel can be selected from; (1) a removing means by sticking sludge to a belt or a drum, and (2) a means in which at least one floating ball are put into the heating and condensing vessel and the floating balls to which sludge was stuck is discharged, and these are preferable in attaining the purposes of the invention more sufficiently. As a means of separating sludge removed from the upper portion of the waste or sludge removed from the lower portion of the heating and condensing vessels into solid materials and liquid can be freely selected from a filtering method, a centrifugation method, or other well-known methods.

(1) and (2) are described hereinafter according to the drawings.

FIG. 7 shows an example of a device of removing sludge stuck to a drum. In this figure, 740 denotes a drum which is rotated to the direction as shown in the figure, permitting floating sludge to stick to the peripheral wall surfaces and to be removed from the liquid surface, sludge stuck to said peripheral wall surfaces is cleaned out with a doctor blade 745 and put into the inside of the filtering unit 741, solid materials and liquid are separated with a filter 742 and the liquid returns to the heating and condensing vessel 71 with the pump 743. 744 denotes a closing valve.

FIG. 8 denotes an example of a device which discharges sludge using floating balls. In this figure, 850 denotes a container for containing floating balls 851, 852 denotes a belt conveyor which carries the floating balls to the inside of the heating and condensing vessel. The floating balls 851 in the heating and condensing vessel 81 float on the liquid surface of the waste, stick to sludge, enter in the filtering unit 854 from an opening 853, and solid materials and liquid are separated and the liquid returns to the heating and condensing vessel 81.

As shown in FIG. 6 in the present invention, it is preferable in working efficiency that the mixture of the sludge discharged from the liquid level and the lower portion of the heating and condensing vessel and the waste is separated into a solid and liquid and the liquid is returned to the heating and condensing vessel.

In the present invention, performing chemical treatment of the waste before or after sending it to the inside of the heating and condensing vessel is preferable because an increase in adhesion in concentrating the waste in the heating and condensing vessel is suppressed and the removal of sludge using a filter etc. becomes easy.

The chemical treatment in the invention comprises a process of neutralizing, a process of adding an acid, and a process of adding a coagulant to precipitate solid materials.

In the invention, at least one of neutralization, the addition of an acid, and the addition of a coagulant is preferably carried out.

The acid used for neutralizing the waste in the invention includes sulfuric acid, hydrochloric acid, phosphoric acid, oxalic acid, citric acid, and tartaric acid, and the alkali for neutralizing includes calcium hydroxide sodium hydroxide, potassium hydroxide and an organic amine. Among these, odorless or virtually odorless one is preferable and inorganic one is also preferable.

In the present invention, using acids or alkalies, the pH of the waste is preferably neutralized to be within a range of 5–9, more preferably, in a range of 6–8.

As a coagulant for example, aluminum sulfate, magnesium sulfate, aluminum polychloride, calcium chloride, magnesium chloride, polyacrylamide typed polymer, and polyacrylic acid (salts) are preferably used. Among these, inorganic compounds are preferable and can be used as solutions dissolved in a solvent such as water.

When a coagulant agent is added, the above-mentioned filter is preferably used together in order to remove coagulated materials.

Coagulants agents are preferably added on or after the addition of acids or alkalies.

A process of removing solid materials or sludge after the chemical treatment process including a neutralizing process with acids or alkalies is preferably provided.

It is desirable as preferred embodiments in the invention that an embodiment of a chemical treatment process which is carried out before a heating and condensing process, an embodiment provided with a process of removing solid materials and sludge precipitated from the waste between the chemical treatment process and the heating and condensing process, and an embodiment to which a process of removing solid materials and sludge from the waste treated with the heating and condensing process is added.

Removing solid materials and sludge produced with the heating and condensing from the waste process is preferably carried out while acids, neutralizing agents, or coagulating agents are added to the waste.

The fourth embodiment in the invention is described in detail hereinafter.

FIGS. 9 and 10 are sectional views showing a treating device according to the invention, where 91 denotes a treating tank for chemical treatment, 92 denotes a neutralizing agent tank for containing a neutralizing agent, 94 denotes a process waste tank for containing the process waste, 95 denotes a heating and condensing vessel, 96 denotes a means of discharging solid materials, located at the lower portion of the heating and condensing vessel 95, 97 denotes a heating unit, 98 denotes a level sensor which controls the height of the liquid level in the heating and treating vessel 95, 99 denotes a condensing unit which condenses gases evaporated from the process waste in the heating and condensing vessel 95, 910 denotes a receiver for containing condensed liquid, 911 denotes a filter, 912a, 912b, and 912d denote pumps, and 913 denotes an agitator. In FIG. 10, 93 denotes a coagulating agent tank for containing coagulating agents, and 912c denotes a pump.

The treating tank 91 is preferably a metal (preferably stainless) cylindrical tank having protective coat with fluororesins (such as Teflon), and a filter 911 is provided in order to remove solid materials produced by chemical treatment in the tank from the liquid to be sent to the heating and condensing vessel. A filter such as TC-100 (a product of Tocell) can be used as the filter 911. After filtering with the filter 911, it is possible that the liquid is not directly sent to the heating and treating vessel 95 and is temporally stored in a liquid storing tank located in the middle. Also, the neutralizing agent tank 92 may be provided as two types for acids and alkalies.

The well known heating and condensing vessels described in Japanese Patent O.P.I. Publication No. 118346/1987, and No. 118346/1987 may be used.

Next, a method in the invention is described according to the embodiment of the device.

First, the waste (such as overflow liquid) discharged from a treating device for light-sensitive materials is placed into the waste tank 94. The waste is then send to the treating tank 91 using the pump 912a. Next, the chemical process liquid is send from the neutralizing agent tank 92 and/or the coagulating agent to the treating tank 91 using pumps 912b, 912c by required quantity, and is agitated and mixed using the agitator 913 to precipitate solid materials. In this operation, the liquid's pH in the treating tank 91 is measured using a pH meter (not shown), the operation of the pump 912b is controlled to keep the required pH. The solid materials of the waste in which chemical treatment was finished is filtered and the filtrate only is sent to the heating and condensing vessel 95. In the heating and condensing vessel 95, the waste is heated with the heating unit 97, gas heated and evaporated from the surface of the waste is condensed to liquid to be placed in the receiver 910. On the other hand, the condensed process waste produces sludge containing resins in it. The sludge is discharged using a discharging means 96.

In addition, as methods of discharging sludge, embodiments shown in FIG. 1 through FIG. 8, FIG. 13, and FIG. 14 can be used.

As shown in the above-mentioned invention, using the combination of neutralization operating and condensing agent adding operation, the waste of non-silver halide light-sensitive material such as the waste for light-sensitive lithographic printing plate in particular is separated into solid materials and liquid, completely, and the adhesion of solid materials precipitated decreases, which permits the separation into solid materials and water to be easier, stable, and effective.

EXAMPLES

Example 1

Using a device as an embodiment shown in FIG. 1, an evaporator 110 had a capacity to contain 1.6 liters of a waste volume and 2 liters of a clearance volume. As a heating member, a pipe made of stainless steel (10 mm in diameter) which was filled with a sintered material powder (mean grain diameter was about 50 μm) of semiconductor components to a length of 200 mm (main components were $Fe_2O_3$, CoO, $Cr_2O_3$, $WO_2$, C, $Al_2O_3$, and Ni) was used. The capacity of the waste tank 11 where the supply power was 100 VAC and 10 A was 20 liters, and the capacity of a collecting container 168 was 10 liters.

A TC-1 (product of Tocell) as a filter $F_1$, about 1000 g of coconut shell activated carbon as an absorbent of an absorption tank 162, and an activated carbon cartridge AP-117 by Quno Corporation as a filter $F_2$ were used respectively.

As an automatic developing machine, an embodiment shown in FIG. 11 was used. In FIG. 11, *1 and *1, *2 and *2, and *3 and *3 are connected by the each pipeline.

In FIG. 11, 101 is a developing section, 102 is a water washing section, 103 is a rinse/gum section for rinse treatment or treatment for immunity to fat, 101a is a developer tank, 102a is a washing water tank, 103a is a rinse/gum liquid tank for keeping rinse liquid or gum liquid in, 104 is a non-silver halide light-sensitive material, 105, 106, and 107 are treating solution supplying pipes for supplying the developer and other treating solutions, and P4, P5, and P6 are pumps.

As the developer, a mixture of the following (A) and (B) blended at a ratio of (A):(B) = 1:5 (volume ratio) was used.

(A) Condensed developer

| | |
|---|---|
| Sodium silicate (JIS No. 3) | 730 g |
| Sodium hydroxide | 220 g |
| Emulgen 950 (a trademark, a surface-active agent, by Kao Corp.) | 3 g |
| EDTA | 1.5 g |
| Water | 92.5 g |

(B) Water

As a non-silver halide light-sensitive material, a positive type PS plate SMP-N (a trademark of Konica Corp.) with 1003 mm × 800 mm in size was used, and 20 liters of the above developer was filled into the developer tank 101a. The replenishing rate of the developer was 116 milliliters per the above PS plate.

15 liters of water was poured into the washing water tank 102a and sprayed from a nozzle 106 to the PS plate. The water running down and returning to the washing water tank 102a was used by circulating.

Ten (10) liters of the rinse solution of the following composition was charged into the rinse/gum solution tank 103a, and supplied from a nozzle 107 to the PS plate. The solution running down and returning to the rinse/gum solution tank 103a was used by circulating.

| Rinse solution | |
|---|---|
| Di(2-ethylhexyl)sulfosuccinic ester sodium | 30 wt parts |
| Sodium dihydrogenphosphate dihydrate | 10 wt parts |
| Citric acid monohydrate | 2 wt parts |
| Phosphoric acid (85%) | 0.3 wt parts |
| Pure water | 1 l |

In such a way, the above 500 PS plates were treated, and then 78 liters of the waste from the developer tank 101a, 15 liters of the waste in the washing water tank 102a, and 10 liters of the waste in the rinse/gum liquid tank were filled into the waste tank 1 of the waste treating device shown FIG. 1, and treated by the waste treating device, the required time of the waste treating took 100 hours. The recovered liquid was about 92 liters of water, which was colorless, transparent, odorless, and looked like distilled water. The recovered sludge was a little sticky, whose apparent volume (bulk) was about 1.3 liters.

When the same test was carried out using the water obtained by separation and recovery in the above test as water for diluting the developer, a good result of the developing treatment was obtained.

On the treatment by this automatic developing machine, a 92-liter portion was recovered from 98 liters of water contained in the consumed treating solution, whose recovery was 94%. And, the percentage of the recovered water volume to the consumed treating solution volume was 88% (parts by weight).

For the above waste, the treating ability of the filter $F_1$ was about 1200 liters, and the treating ability of the absorption tank 162 was about 1600 liters. And the required time of the work for the replacements of the filter used for the filter $F_1$ and the activated carbon used for the absorption tank 162 was a few minutes (the former was about 5 minutes and the latter was about 7 minutes), and the work was easy.

Cooling water in a cooler 152 was used by circulating, and heat-exchanged for the atmosphere through a heat exchanger which was not shown.

EXAMPLE 2

The procedure of Example 1 was repeated except that a negative type PS plate SWN-N (a trademark and make of Konica Corp., size 1003×800 mm) was used as a non-silver halide light-sensitive material, the following (A) and (B) as the developer were mixed at the ratio of (A):(B)=1:2 (volume ratio), the following gum liquid was filled into the rinse/gum tank 108a, and the replenishing rate per PS plate was 90 milliliters after the treatment of the above 300 PS plates. Good developing treatment was obtained.

(A) Concentrated developer

| | |
|---|---|
| Benzyl alcohol | 360 g |
| Triethanolamine | 1500 g |
| Pelex NBL (trademark of Kao Corp., sodium t-butylnaphthalene sulfonate) | 180 g |
| Sodium sulfite | 90 g |
| Water | 3 l |

(B) WATER

| Gum Liquid | |
|---|---|
| Dextrin (by Nichiden Kagaku) | 20 g |
| Carboxymethyl cellulose | 1 g |
| 75% Phosphoric acid | 0.6 g |
| Nikkol OTP-10C (by Nikko Chemicals) | 0.2 g |
| Span 20 (by Kao Corp.) | 0.2 g |
| Pure water | 200 ml |

The result regarding the related waste treatment is shown as follows:

| Waste volume | |
|---|---|
| Developer waste | 47 l |
| Washing water waste | 12 l |
| Gum waste | 10 l |
| Total | 69 l |
| Recovered water volume | 62 l |
| Sludge | 0.9 l |

Replacement work of the filter $F_1$ and the absorbent: same as Example 1

EXAMPLE 3

Using a device as an embodiment shown in FIG. 1, an evaporated 110 had a capacity to contain 1.6 liters of a waste volume and 2 liters of a clearance volume. As a heating member, a pipe made of stainless steel (10 mm in diameter), whose inside was bake-finished by using the silicon resin, was filled to a length of 200 mm with each powder (mean grain diameter was about 50 μm) of semiconductor components (main components were $Fe_2O_3$, CoO, $Cr_2O_3$, $WO_2$, $Al_2O_3$, Ni, $Na_2O$, $SiO_2$, CaO) and sintered for 5 minutes by supplying power 100 VAC, 10 A, and the supply power at that time was 100 VAC, 10 A. The capacity of the waste tank 11 was 20 liters, and the capacity of the collecting container 168 was 10 liters.

A TC-1 (product of Tocell) as a filter $F_1$, about 1000 g of coconut shell activated carbon as an absorbent of the absorption tank 162, and an activated carbon cartridge AP-117 by Quno Corporation as a filter $F_2$ were used respectively.

As an automatic developing machine, an embodiment shown in FIG. 12 was used. In FIG. 12, *1 and *1, *2 and *2, and *3 and *3 are connected by the each pipeline.

In FIG. 12, 1201 is a developing section, 1202 is a water washing section, 1203 is a rinse/gum section for rinse treatment or treatment for immunity to fat, 1201a is a developer tank, 1202a is a washing water tank, 1203a is a rinse/gum liquid tank for keeping rinse liquid or gum liquid in, 1204 is a non-silver halide light-sensitive material, 1205, 1206, and 1207 are treating solution supply pipes for supplying the developer and other treating solutions, $P_4$, $P_5$, and $P_6$ are pumps, 1211 is a condensing developer tank with the condensed solution of the developer, 1212 is a dilution water tank with the dilution water for the condensed developer, and 1213 is a mixing tank where the condensed developer and the dilution water are mixed.

The developer became a mother developer and a replenishing solution by mixing (A) with (B) at the following ratio (volume ratio).

(A) Concentrated developer

| | |
|---|---|
| Sodium silicate (Nippon Chemical Industrial Co., Ltd.) | 730 g |
| Potassium hydroxide | 220 g |
| Emulgen 950 (a trade name, a surface active agent, by Kao Corp.) | 3 g |
| EDTA | 1.5 g |
| Water | 1 liter |
| (B) water | 15 liter |

| | (A):(B) |
|---|---|
| Mother developer | 1:5 |
| Replenishing solution | 1:3 |

(Note) The "mother developer" is a developer filled into the developer tank 101a at the begining of the developing treatment.

As a light-sensitive lithographic PS plate, a positive type PS plate SMP-N (a trademark, product of Konica Corp.) with 1003 mm × 800 mm in size was used, and 20 liters of the above mother developer were filled into the developer tank 1201a, and the developer was sprayed through a treating solution supply nozzle 1205 and used by circulating, and the rate of the replenishing solution was 50 milliliters per above PS plate.

Fifteen (15) liters of water were filled into the water washing tank 1202a, and sprayed from a nozzle 1206 to the PS plate. The water running down and returning to the water washing tank 1202a was used by circulating.

Ten (10) liters of the rinse liquid of the following composition were filled into the rinse/gum liquid tank 1203a, and supplied from a nozzle 1207 to the PS plate, and the liquid running down and returning to the rinse/gum solution tank 1203a was used by circulating.

| Rinse solution | |
| --- | --- |
| Di(2-ethylhexyl)sulfosuccinic ester sodium | 30 wt parts |
| Sodium dihydrogenphosphate dihydrate | 10 wt parts |
| Citric acid monohydrate | 2 wt parts |
| Phosphoric acid (85%) | 0.3 wt parts |
| Pure water | 1000 wt parts |

In such a way, when the above 500 PS plates were treated, and then 22.5 liters of the developer waste, 15 liters of the waste in the washing water tank 1202a, and 10 liters of the waste in the rinse/gum liquid tank 1203a were filled into the waste tank 1 of the waste treating device shown in FIG. 1, and treated by the waste treating device. The required time of the waste treating took 47 hours. The recovered liquid was water about 43 liters, which was colorless, transparent, odorless, and looked like distilled water. The collected sludge was non-sticky granulated material, whose apparent volume (bulk) was about 0.7 liter.

In this example, the water separated and recovered in the collecting container 168 was used as the dilution water, but the difference in the ability from the distilled water used as the dilution water was not recognized.

In the above treatment, a 43-liter portion was recovered from 46 liters of water contained in the consumed treating solution, whose recovery was 93%. And, the percentage of the collected water volume to the consumed treating solution volume was 91% (weight).

The treating available capacity to the allowable limit of using the filter $F_1$ was about 1200 liters, and the treating available capacity to that of the absorption tank 162 was about 1600 liters. And the required time of the work for the replacements of the filter used for the filter $F_1$ and the activated carbon used for the absorption tank 162 was a few minutes (the former was about 5 minutes and the latter was about 7 minutes), and the work was easy.

Cooling water in a cooler 152 was used by circulating, and heat-exchanged for the atmosphere through a heat exchanger which was not shown.

EXAMPLE 4

The procedure of Example 3 was repeated except that a negative type PS plate SWN-N (a trademark, product of Konica Corp.) with 1003 mm×800 mm in size was used as a light-sensitive lithographic PS plate and the following (A) and (B) as the developer were mixed at the ratio of (A):(B)=1:2 (volume ratio), and 10 liters of the following gum liquid were filled into the rinse/gum tank 1203a and the developer waste, the water washing waste and the gum liquid waste were filled together into the waste tank 1, and then the above 500 PSs were treated and the separate-collected water was used as the dilution water for the gum solution. The difference in the ability between the water separated from the waste as the dilution water of the gum liquid and the distilled water was not recognized.

(A) Concentrated developer

| | |
| --- | --- |
| Benzyl alcohol | 360 g |
| Triethanolamine | 210 g |
| Pelex NBL (trade name, by Kao Corp., sodium t-butylnaphthlene sulfonate | 180 g |
| Potassium sulfite | 90 g |
| Water | 3 l |

(B) water

The developer (using solution) was made by mixing the above (A) and (B) at the following ratio (volume ratior).

(B) Water

The developer (using solution) was made by mixing the above (A) and (B) at the following ratio (volume ratio).

| | (A):(B) |
| --- | --- |
| Mother solution | 1:3 |
| Replenishing solution | 1:3 |

| Gum liquid | |
| --- | --- |
| Dextrin (by Nichiden Kagaku) | 20 g |
| Carboxymethyl cellulose | 1 g |
| 75% Phosphoric acid | 0.6 g |
| Nikkol OPT-100 (by Nikko Chemicals) | 0.2 g |
| Span 20 (by Kao Corp.) | 0.2 g |
| Pure water | 200 ml |

After the treatment of the above PS plates, the developer waste was 22.5 liters, the washing water waste was 15 liters, the rinse/gum liquid waste was 10 liters, and the required time of the waste treating took 45 hours. The recovered liquid was about 40 liters of water, which was colorless, transparent, odorless, and looked like distilled water. A recovered sludge was non-sticky granulated material, whose apparent volume (bulk) was about 0.4 liters. On the above treatment, a 43-liter portion was recovered from 40 liters of water contained in the consumed treating solution, and the recovery was 93%. And, the percentage of the collected water volume to the consumed treating solution volume was 84% (weight).

For the above mixed waste, the treating available capacity to the allowable limit of using the filter $F_1$ was about 1500 liters, and the treating available capacity to that of the absorption tank 162 was about 1000 liters. And the required time of the work for the replacements of the filter used for the filter $F_1$ and the activated carbon used for the absorption tank 162 was a few minutes (the former was about 5 minutes and the latter was about 7 minutes), and the work was easy.

EXAMPLE 5

The printing plate obtained in Example 3 was attached to a printing machine to print. To do so, a 46-time dilution (SEU-3: distilled water=1:45) of a Konica plate etching solution SEU-3 (product of Konica Corp.) with a distilled water and a 46-time dilution of the same with the recovered water (portion of about 43 liters of water recovered in Example 1) were used as a moistening water. Either case provided a large number of good prints.

EXAMPLE 6

The procedure of Example 3 was followed except that a 15-liter portion of about 43 liters of water recovered by the waste treating device was charged in the water washing tank 1203a of the automatic developing machine shown in FIG. 12. Similar results as in Example 3 were obtained.

EXAMPLE 7

As the light-sensitive material, a 1003 mm×800 mm positive PS plate SMP-N (Trademark of Konica Corp.)

was treated in the developer with the following compositions using the automatic developing machine. It was then washed with a cyclic water and then treated with the rinse liquid having the following compositions.

| Developer Compositions | |
|---|---|
| A potassium silicate (Nippon Chemical Industrial Co., Ltd.) | 730 g |
| Potassium hydroxide | 220 g |
| Emulgen 950 (trademark, surface-active agent, Kao Corp.) | 3 g |
| Pure water | 8 l |
| Rinse Liquid Composition | |
| Di(2-ethylhexyl)sulfosuccinic ester sodium salt | 30 wt parts |
| Sodium dihydrogenphosphate dihydrate parts | 10 wt parts |
| Citric acid monohydrate | 2 wt parts |
| Phosphoric acid | 0.3 wt parts |
| Pure water | 1000 wt parts |

A mixture consisting of 32 liters of the developer waste used to treat the above PS plates 200 in number, 15 liters of the cycling washing water, and 8 liters of the rinse liquid waste used to treat the above PSs 200 in number was treated with the device shown in FIG. 2.

A heating and condensing vessel 21 was of a 3-liter cylindrical stainless steel, and an opening 220 was formed in the side 17 cm below the top. The opening 220 is rectangular of 1 cm long and 5 cm wide.

A filter 225 was of a 50-mesh stainless steel and a liquid flow rate was 300 l/min. A heating unit 23 was a 1.2-W electric heater. A liquid level sensor 25 was a contact electrode type stainless steel pole bolt. The liquid level in the heating and condensing vessel 21 was kept in the range of 10 mm above and 3 mm below the center of the opening 220 by controlling the operation of a pump 28.

With the device as above, the aforementioned waste to be treated was treated to result in a treating rate of 1.2 l/hour. A discharge means 22 was continuously operated all the way through the above treatment. In the above treatment, a solid produced as a result of condensation in the heating and condensing vessel 21 floated in the upper part of the liquid and could be readily removed by the discharge means 22, so that a stable treatment could be done over the 48-hour operation. And, upon completing the above treatment, no sludge adhered to the liquid level sensor 25 and the inner wall of the heating condensing vessel as well as the heating surface by means of the heating unit 23.

EXAMPLE 8

As a light-sensitive material, a 1003 mm×800 mm negative type PS plate SWN (trademark of Konica Corp.) was treated with the developer having the following composition using the automatic developing machine. It was then washed with a cycling water and treated with a gum liquid having the following composition.

| Developer Composition | |
|---|---|
| Benzyl alcohol | 360 g |
| Triethanolamine | 210 g |
| Pelex (trademark of Kao Corp., sodium t-butylnaphthalene sulfonate) | 180 g |
| Potassium sulfite | 90 g |
| Water | 10 l |
| Gum Liquid | |

| Developer Composition | |
|---|---|
| Dextrin (Nichiden Kagaku) | 20 g |
| Carboxymethylcellulose | 1 g |
| 75% phosphoric acid | 0.6 g |
| Nikkol OTP-100 (trademark of Nikko Chemicals) | 0.2 g |
| Span 20 (Trademark of Kao Corp.) | 0.2 g |
| Pure water | 200 ml |

A mixed liquid consisting of 18 liters of the developer waste used to treat the above PSs 300 in number, 15 liters of the cycling washing water, and 8 liters of the gum liquid waste was treated with the device shown in FIG. 4.

The procedure of Example 7 was repeated except that with a stainless steel rotary drum (30 rpm) with a diameter of 15 cm and a length of 10 cm and a Teflon doctor blade, the sludge was discharged through the opening (of rectangular, 1-cm long and 8-cm wide).

A treating rate was 1.2 l/hour and the treatment could be done stably during the 35 hours' operation. Upon completing the above treatment, no sludge was adhered to the inner wall of the heating and condensing vessel and the liquid level sensor.

EXAMPLE 9

As a light-sensitive material, a 1003 mm×800 mm positive type PS plate SMP (trademark of Konica Corp.) was treated with the developer having the following composition using the automatic developing machine. It was then treated with rinse solution having the following composition.

| Developer Composition | |
|---|---|
| A potassium silicate (Nippon Chemical Industrial Co., Ltd.) | 730 g |
| Potassium hydroxide | 220 g |
| Emulgen 950 (trademark, surface-active agent, Kao Corp.) | 3 g |
| Pure water | 8 l |
| Rinse Solution Composition | |
| Di(2-ethylhexyl)sulfosuccinic ester sodium salt | 30 wt parts |
| Sodium dihydrogen phosphate dihydrate | 10 wt parts |
| Citric acid monohydrate | 2 wt parts |
| Phosphoric acid | 0.3 wt parts |
| Pure water | 1000 wt parts |

A mixed liquid consisting of 48 liters of the developer waste used to treat the above 300 PS plates, 15 liters of the cycling washing water waste, and 8 liters of the rinse solution waste was treated with the device shown in FIG. 6.

A heating and condensing vessel 61 was of a 3-liter cylindrical stainless steel, and an opening 620 was formed in the side wall 17 cm below the top and another opening 630 formed in the lowermost side wall of the heating and condensing vessel 61. The opening 620 was rectangular of 1 cm long and 5 cm wide. The opening 630 was circular with a diameter of 3 cm.

Filters 625, 634 were of a 50-mesh stainless steel and a liquid feed rate was 300 l/min (discharge means 62) and 500 l/min (discharge means 63). A heating unit 64 was a 1.3-W electric heater. A liquid level sensor 65 was a contact electrode type stainless steel pole bolt. The liquid level in the heating and condensing vessel 61 was kept in the range of 10 mm above and 3 mm below the center of the opening 620 by controlling the operation of a pump 68.

With the device as above, the aforementioned waste to be treated was treated to result in a treating rate of 1.3 l/hour. Discharge means 62 and 63 were continuously operated all the way through the above treatment. In the above treatment, a solid produced as a result of condensation in the heating and condensing vessel 61 floated in the upper part of the liquid and could be readily removed by the discharge means 62, so that a stable treatment could be done over the 55-hour operation. And, upon completing the above treatment, no sludge adhered to the liquid level sensor 65 and the inner wall of the heating and condensing vessel as well as the heating surface by means of the heating unit 65.

EXAMPLE 10

As a light-sensitive material, a 1003 mm×800 mm negative type PS plate SWN (trademark of Konica Corp.) was treated with the developer having the following composition using the automatic developing machine. It was then treated with a cycling water and then with gum solution having the following composition.

| Developer Composition | |
|---|---|
| Benzyl alcohol | 360 g |
| Triethanol amine | 210 g |
| Pelex NBL (trademark of Kao Corp., sodium t-butylnaphthalene sulfonate) | 180 g |
| Potassium sulfite | 90 g |
| Water | 10 l |
| Gum solution | |
| Dextrin (Nichiden Kagaku) | 20 g |
| Carboxymethylcellulose | 1 g |
| 75% phosphoric acid | 0.6 g |
| Nikkol OTP-100 (Trademark of Nikko Chemicals) | 0.2 g |
| Span 20 (trademark of Kao Corp.) | 0.2 g |
| Pure water | 200 ml |

A mixed solution consisting of 22 liters of the developer waste used to treat the above PS plates 400 in number, 18 liters of the cycling washing water waste, and 10 liters of gum solution waste was treated with the device shown in FIG. 7.

The procedure of Example 9 was repeated except that a centrifugal separator 732 was attached to the opening 730 (circular with a diameter of 3 cm) formed in the lowermost side wall of the heating and condensing vessel 71 through a pipe 731.

A treating rate was 1.3 l/hour and the treatment could be done stably during the 39 hours' operation. Upon completing the above treatment, no sludge was seen as adhered to the inner wall of the heating and condensing vessel and the liquid level sensor 65.

EXAMPLE 11

As a light-sensitive material, a 1003 mm×800 mm negative type PS plate SWN (trademark of Konica Corp.) was treated with the developer having the following composition using the automatic developing machine. It was then treated with a gum solution having the following composition then washed with a cycling water.

| Developer Composition | |
|---|---|
| β-anilinoethal | 360 g |
| Diethanolamine | 210 g |
| Pelex NBL (trademark of Kao Corp., surface-active agent) | 180 g |
| Potassium sulfite | 90 g |
| Pure water | 12 l |
| Gum Solution Composition | |
| Dextrin (Nichiden Kagaku) | 20 g |
| Carboxymethyl cellulose | 1 g |
| 75% phosphoric acid | 0.6 g |
| Nikkol OTP-100 (Trademark of Nikko Chemicals) | 0.2 g |
| Span 20 (Trademark of Kao Corp.) | 0.2 g |
| Pure water | 200 ml |

A mixed solution consisting of 22 liters of the developer waste used to treat the above PS plates 400 in number, 15 liters of the washing water waste, and 10 liters of the gum solution waste was treated with the device shown in FIG. 9.

A treating tank 91 was a 2-liter cylindrical stainless steel, and as a neutralizing agent, 20 ml of 20% sulfuric acid was added to one liter of the above mixed process waste and stirred at room temperature for 5 minutes. As a result, a solid substance was produced. This suspension was passed through a filter 911 and sent to the heating and condensing vessel 95 to be separated into solid and an aqueous solution.

As the filter 911, TC-200 (product of Tocell) was used, and as the heating and condensing vessel 95, a 3-liter cylindrical stainless steel was used. A heating unit 97 was a 1-kW electric heater. A liquid feed rate was 100 ml/min when the process waste was fed by means of a pump 912d so that the liquid level in the vessel is kept at a substantially fixed level.

In the above treatment, the solid produced as a result of condensation in the heating and condensing vessel 95 was non-viscous particles, which could be removed readily by a discharge means 96. The treatment could be done stably all the way over the entire operation period. Upon completing the above treatment, no sludge was seen as adhered to the inner wall of the heating and condensing vessel and the liquid level sensor 98.

EXAMPLE 12

A light-sensitive material, a 1003 mm×800 mm positive type PS plate SMP-N (trademark of Konica Corp.) was treated with the developer having the following compositions using the automatic developing machine. It was then treated with a cycling water and treated with rinse solution having the following compositions.

| Developer Compositions | |
|---|---|
| A potassium silicate (Nippon Chemical Industrial Co., Ltd.) | 730 g |
| Potassium hydroxide | 220 g |
| Emulgen 950 (trademark, surface-active agent, Kao Corp.) | 3 g |
| EDTA | 1.5 g |
| Water | 9 l |
| Rinse Solution Composition | |
| Di(2-ethylhexyl)sulfosuccinic ester sodium salt | 30 wt parts |
| Sodium dihydrogenphosphate dihydrate | 10 wt parts |
| Citric acid monohydrate | 2 wt parts |
| Phosphoric acid (85%) | 0.3 wt parts |
| Pure water | 1000 wt parts |

Twenty-three (23) liters of the developer waste used to treat the above PS plates 600 in number, 18 liters of the water washing waste, and 10 liters of the rinse solution waste were placed in the process waste tank 94 shown in FIG. 9.

For the treatment with a neutralizing agent, it was done by the same procedure as in Example 11 except that the neutralizing agent was 50 ml of 20% sulfuric acid. The results were identical to those of Example 11.

EXAMPLE 13

As a light-sensitive material, a 1003 mm×800 mm negative type PS plates SWN (trademark of Konica Corp.) was treated with the developer having the following composition using the automatic developing machine. It was then treated with gum solution having the following composition, then washed with a cycling water.

| Developer Composition | |
| --- | --- |
| Ethylene glycol monophenylether | 360 g |
| Triethanolamine | 210 g |
| Pelex NBL (trademark, Kao Corp., surface-active agent) | 180 g |
| Potassium sulfite | 90 g |
| Pure water | 12 l |
| Gum Liquid Composition | |
| Dextrin (Nichiden Kagaku) | 20 g |
| Carboxymethyl cellulose | 1 g |
| 75% phosphoric acid | 0.6 g |
| Nikkol OTP-100 (Trademark of Nikko Chemicals) | 0.2 g |
| Span 20 (Trademark of Kao Corp.) | 0.2 g |
| pure water | 200 ml |

A mixture consisting of 22 liters of the developer waste used to treat the above PS plates 400 in number, 15 liters of the washing water waste, and 10 liters of the gum solution waste was treated with the device shown in FIG. 10.

A treating tank 91 was of a 2-liter cylindrical stainless steel, and as a neutralizing agent and a coagulating agent, 20 ml of 20% sulfuric acid and 20 ml of 20% aluminum sulfate were added to one liter of the above mixed process waste and stirred at room temperature for 5 minutes. As a result, a solid substance was produced.

This suspension was passed through a filter 911 and sent to the heating and condensing vessel 95 to be separated into solid and water. As the filter 911, TC-100 (product of Tocell) was used, and as the heating and condensing vessel 95, a 2-liter cylindrical stainless steel was used. A heating unit 97 was a 1-kW electric heater. The liquid feed rate was 100 ml/min when the process waste was fed by means of a pump 912d so that the liquid level in the vessel was kept at a substantially fixed level.

In the above treatment, the solid produced as a result of condensation in the heating and condensing vessel 95 was non-viscous particles, which could be removed readily by a discharge means 96. The treatment could be done stably over the entire operation period. Upon completing the above treatment, no sludge was seen adhered to the inner wall of the heating and condensing vessel or the liquid level sensor 98.

Example 14

As a light-sensitive material, a 1003 mm×800 mm positive type PS plate SMP-N (trademark of Konica Corp.) was treated with a developer having the following composition using the automatic developing machine. It was then washed with a cycling water, and treated with rinse solution having the following composition.

| Developer Composition | |
| --- | --- |
| A potassium silicate (Nippon Chemical Industrial Co., Ltd.) | 730 g |
| Potassium hydroxide | 220 g |
| Emulgen 950 (Trademark, surface-active agent, Kao Corp.) | 3 g |
| EDTA | 1.5 g |
| Water | 9 l |
| Rinse Solution Composition | |
| Di(2-ethylhexyl)sulfosuccinic ester sodium salt | 30 wt parts |
| Sodium dihydrogen phosphate dihydrate | 10 wt parts |
| Citric acid monohydrate | 2 wt parts |
| Phosphoric acid | 0.3 wt parts |
| Pure water | 1000 wt parts |

23 liters of the developer waste used to treat the above PS plates 600 in number, 18 liters of the water washing waste, and 10 liters of the rinse solution waste were placed and treated in the process waste tank 94 shown in FIG. 10.

For the treatment with a neutralizing agent and a coagulating agent, it was done by the same procedure as in Example 13 except that the neutralizing agent was 50 ml of 20% sulfuric acid and the coagulating agent 30 ml of 28% aluminum trichloride.

A process waste accommodating chamber 91 was of a 2-liter stainless steel and a heating and condensing vessel 95 was of 3.6-liter cylindrical stainless steel.

The heating unit 97 was a 1-kW electric heater. A pump was a magnet pump, and a liquid feed rate from the process waste accommodating chamber 91 to the heating and condensing vessel 95 was determined as 300 ml/min. The filter 911 was a TC-100 (Tocell).

The above process waste was treated with the above treating device. An evaporating rate was 1 l/hour, and the level of the waste in the heating and condensing vessel 95 was stably kept through the entire operating period of the device.

Effects of the Invention

The present invention provides the following effects:
(1) Waste treating space reduced.
(2) Waste treating workability improved. Specifically, adhesion of the viscous sludge to the heater and liquid level sensor in the heating and condensing vessel and to the inner wall of the heating and condensing vessel and any trouble resulting therefrom can be remedied.
(3) Waste treating costs lowered.
(4) Recycling of water source.

Brief Description of the Drawings

21, 41, 51 ... Heating and condensing vessel
22, 42, 52 ... Discharge means
23, 43, 53 ... Heating unit
25, 45, 55 ... Liquid level sensor
27, 47, 57 ... Process waste tank
28, 48, 443, 58, 556, 223 ... Pump
29, 49, 59 ... Condensing unit
210, 410, 510 ... Liquid receiver
222, 442, 555 ... Filtering unit

61, 71, 81 ... Heating and condensing vessel
62, 63, 72, 73, 82, 83 ... Discharge means
64, 74, 84 ... Heating unit
65, 75, 85 ... Liquid level sensor
67, 77, 87 ... Process waste tank
68, 623, 633, 78, 743, 733, 88, 856 ... Pump
69, 79, 89 ... Condensing unit
610, 710, 810 ... Liquid receiver
622, 735, 855 ... Filtering unit

91 ... Treating tank
92 ... Neutralizing agent tank
93 ... Coagulant tank
94 ... Process waste tank
95 ... Heating and condensing vessel
96 ... Discharge means
97 ... Heating unit
98 ... Liquid level sensor
99 ... Condensing unit
910 ... Liquid receiver
911 ... Filter
912a, 912b, 912c, 912d ... Pump
913 ... Stirrer

Figure 1:
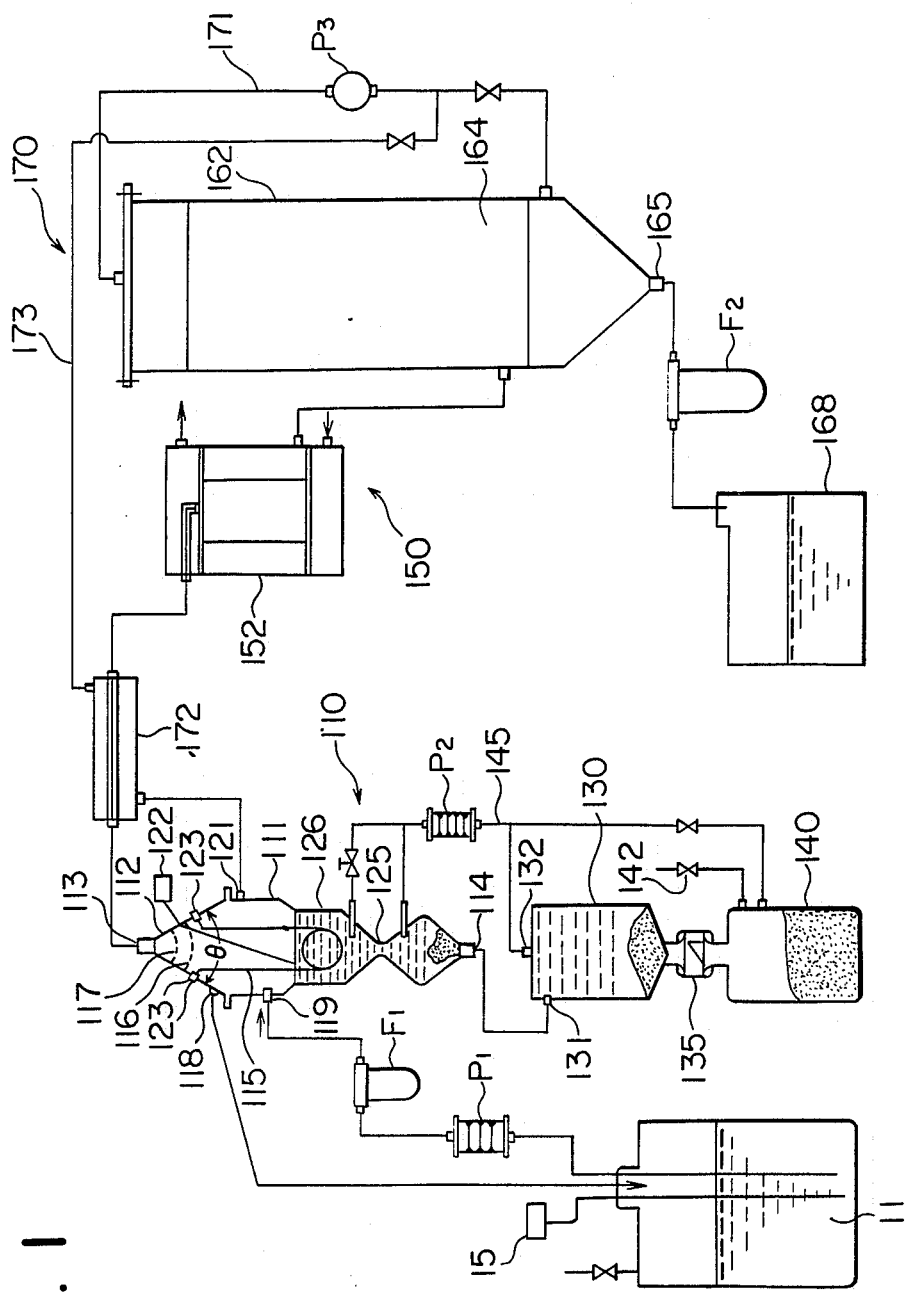
FIGS. 1 and 13 are schematic views of a waste treating device used in the present invention.
11 . . . Waste tank
$F_1, F_2$ . . . Filter
$P_1, P_2, P_3$ . . . Pump
110 . . . Evaporator
111 . . . Cylindrical portion
112 . . . Cone-shaped wall
116, 117 . . . Mesh member
115 . . . Heating member
126 . . . Liquid reservoir
130 . . . Sludge separator
140 . . . Sludge tank
145 . . . Liquid circulating device
150 . . . Vapor gas treating device
152 . . . Cooler 162 ... Absorption tank
164 ... Absorbent container
168 ... Collecting container
170 ... Circulating unit
171 ... Tube unit
172 ... Heat exchanger
180 ... Filter
181 ... Cap
Figure 2:
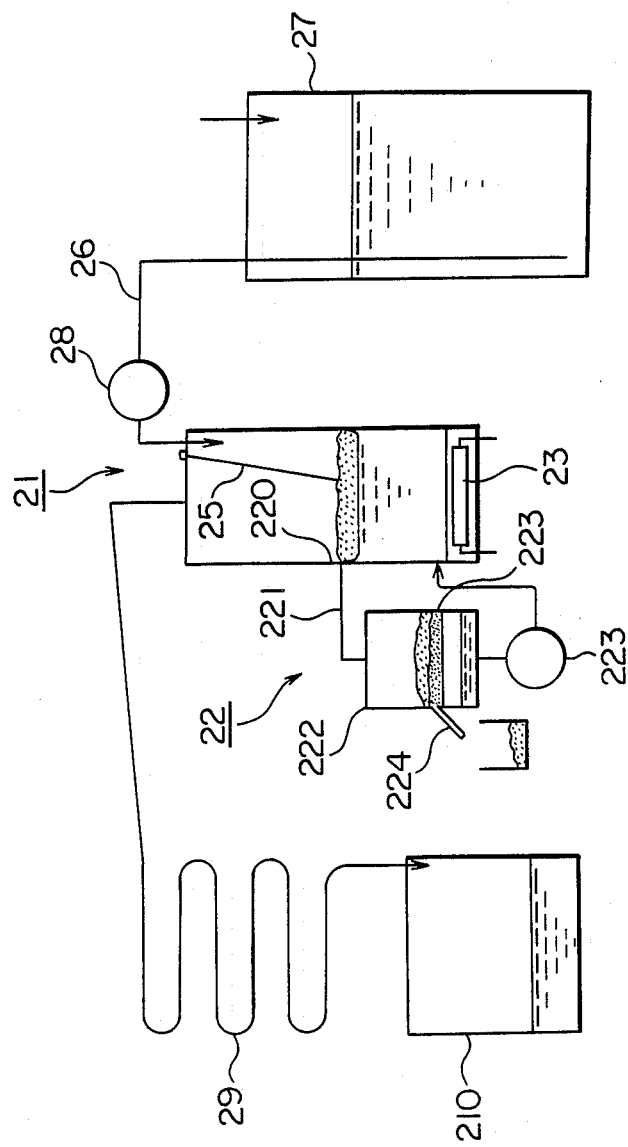
FIGS. 2 through 5 and 14 are sectional views showing examples of the treating device of the present invention.
Figure 3:
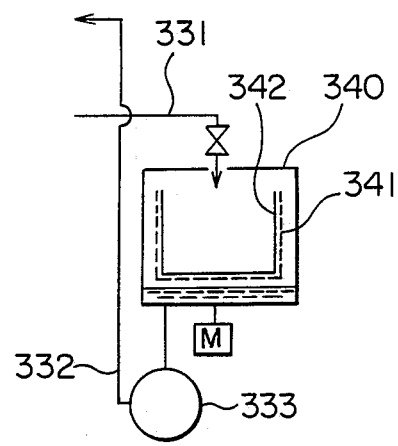
Figure 4:
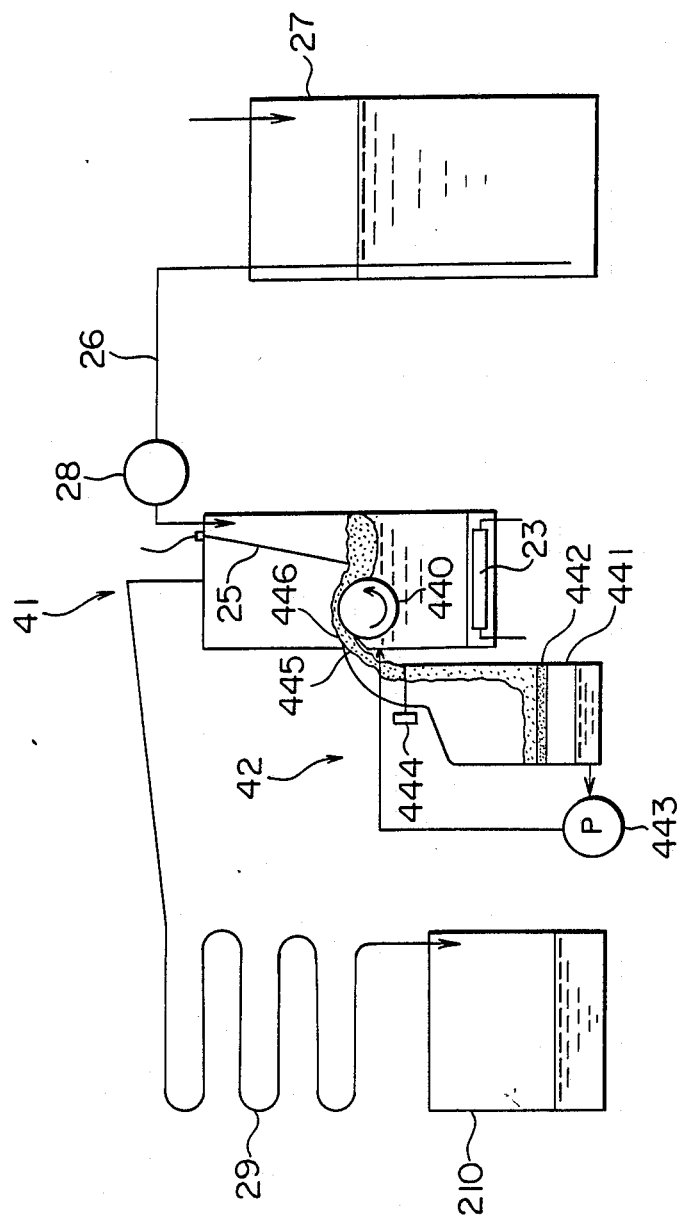
Figure 5:
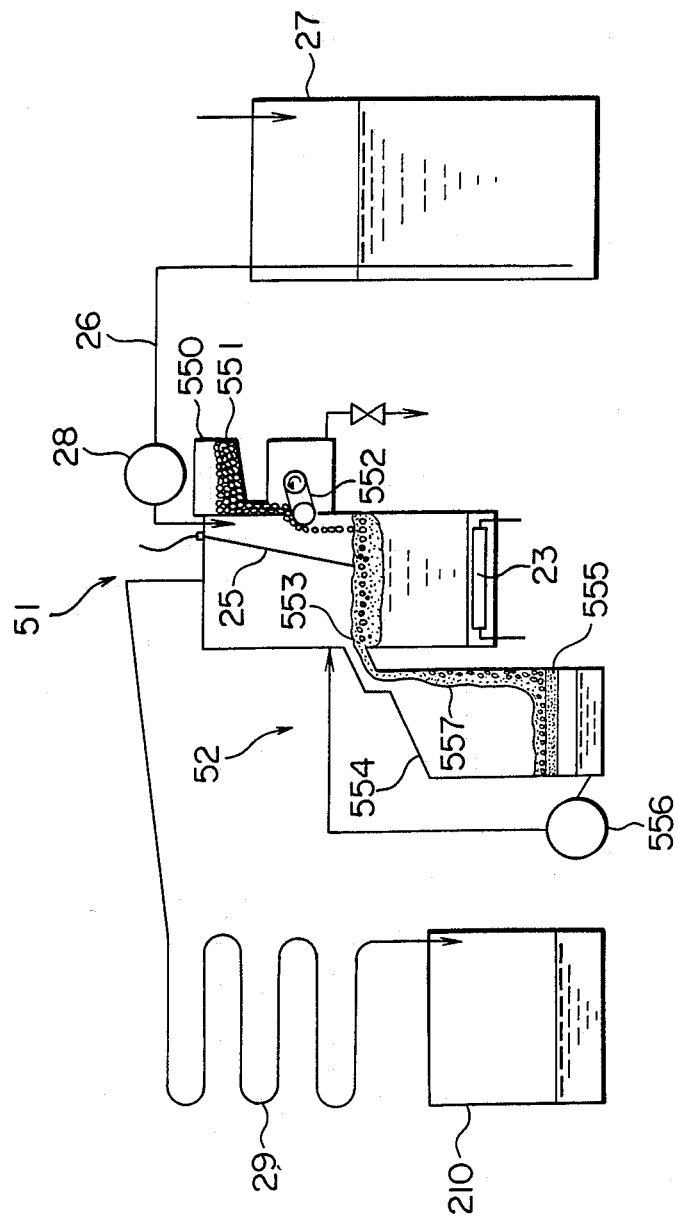
Figure 6:
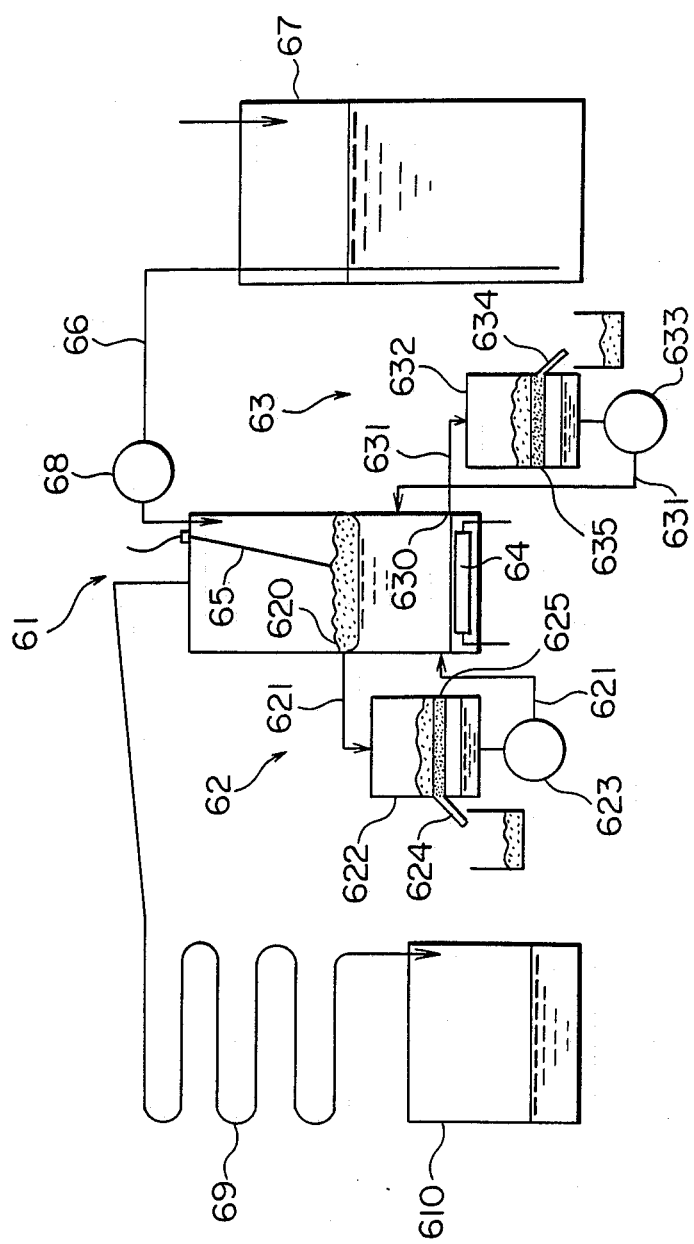
FIGS. 6 to 8 are sectional views showing examples of the treating device of the present invention.
Figure 7:
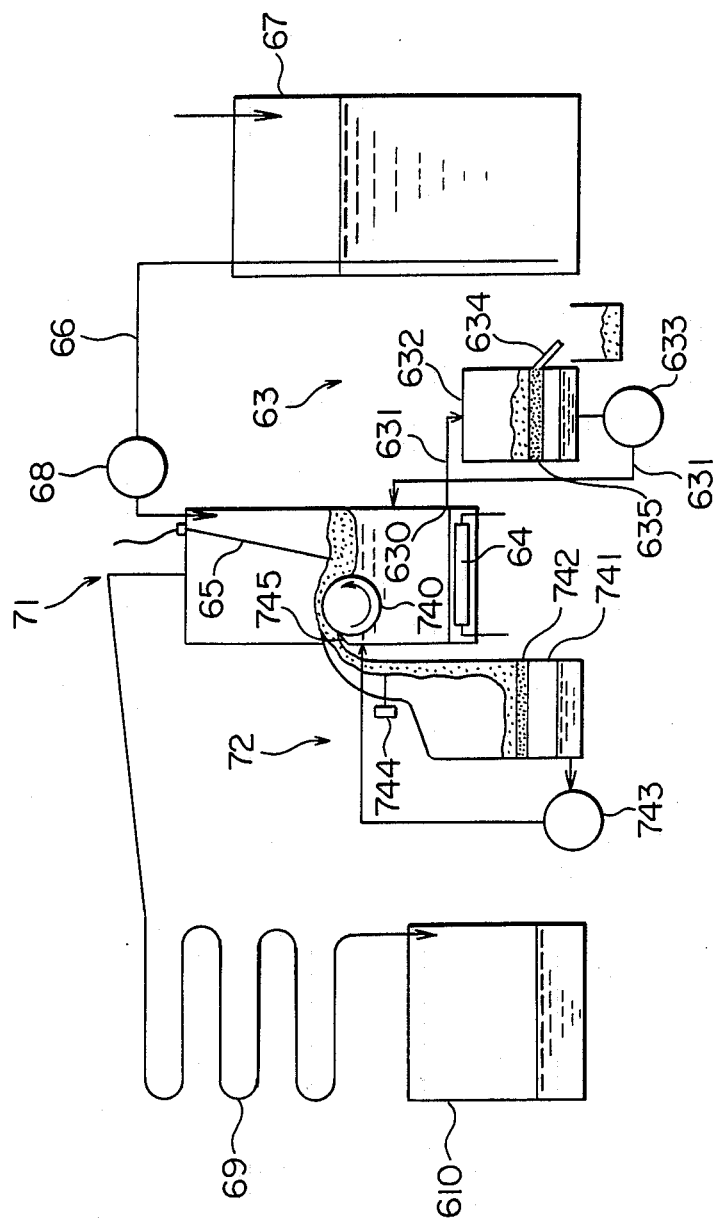
Figure 8:
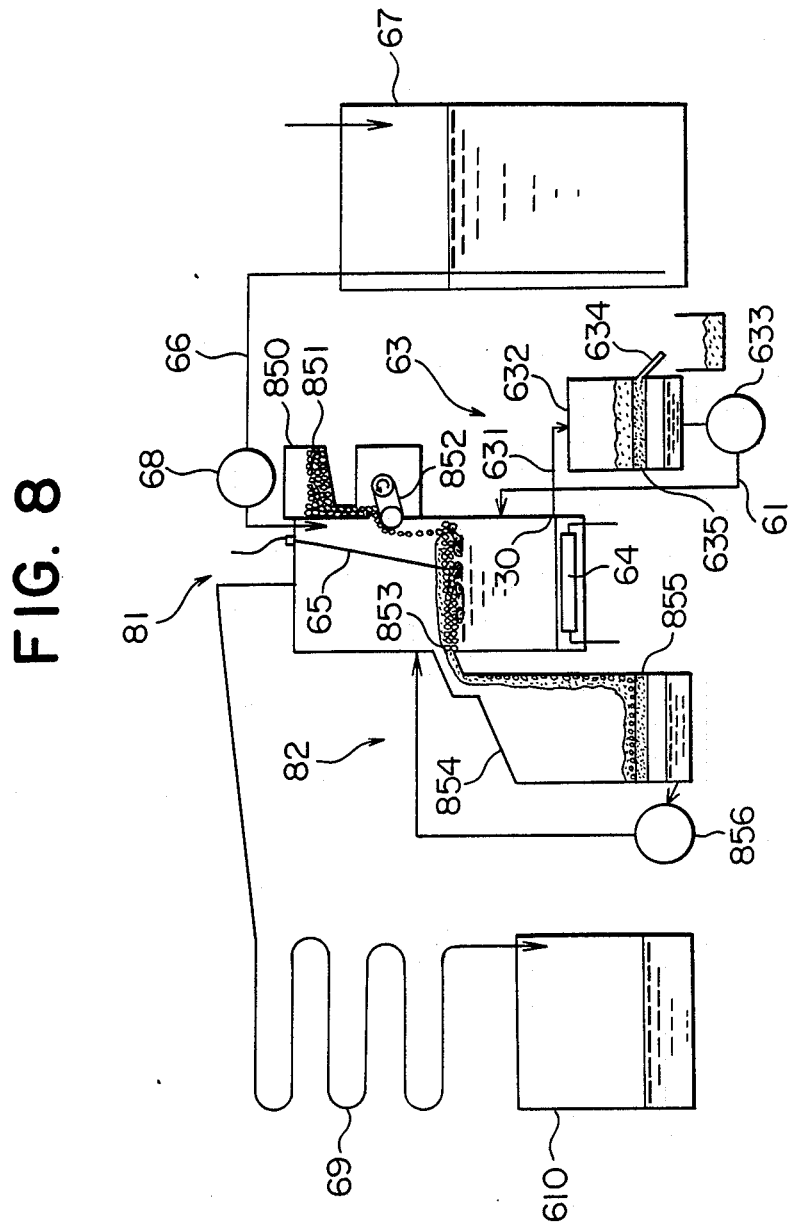
Figure 9:
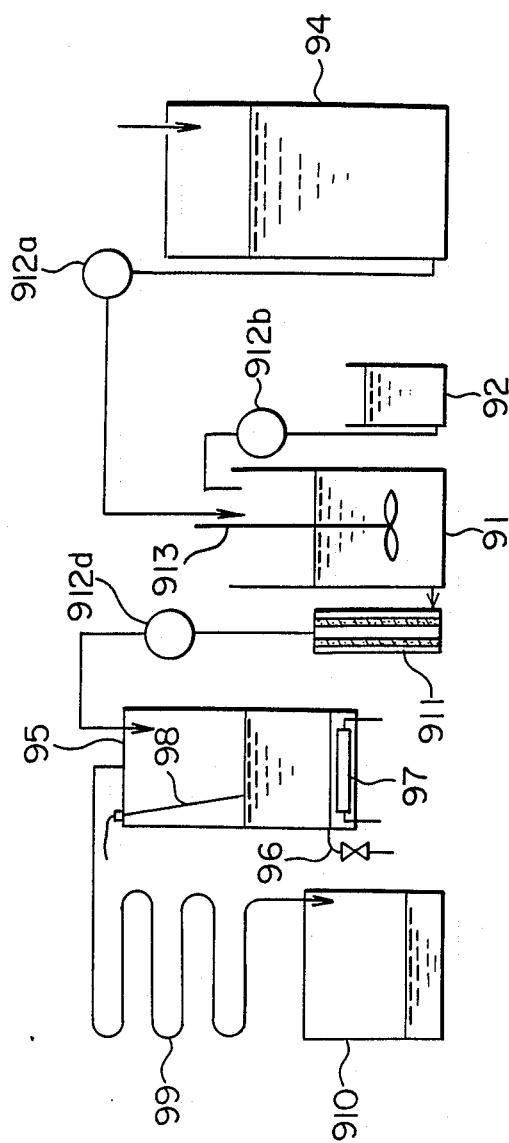
FIGS. 9 and 10 are sectional views showing examples of the treating device of the present invention.
Figure 10:
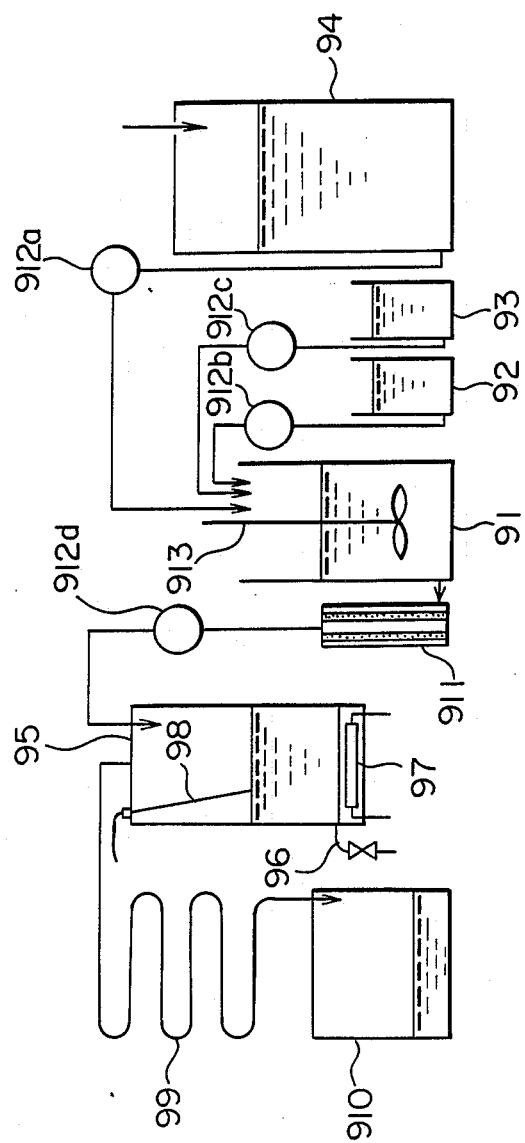
Figure 11:
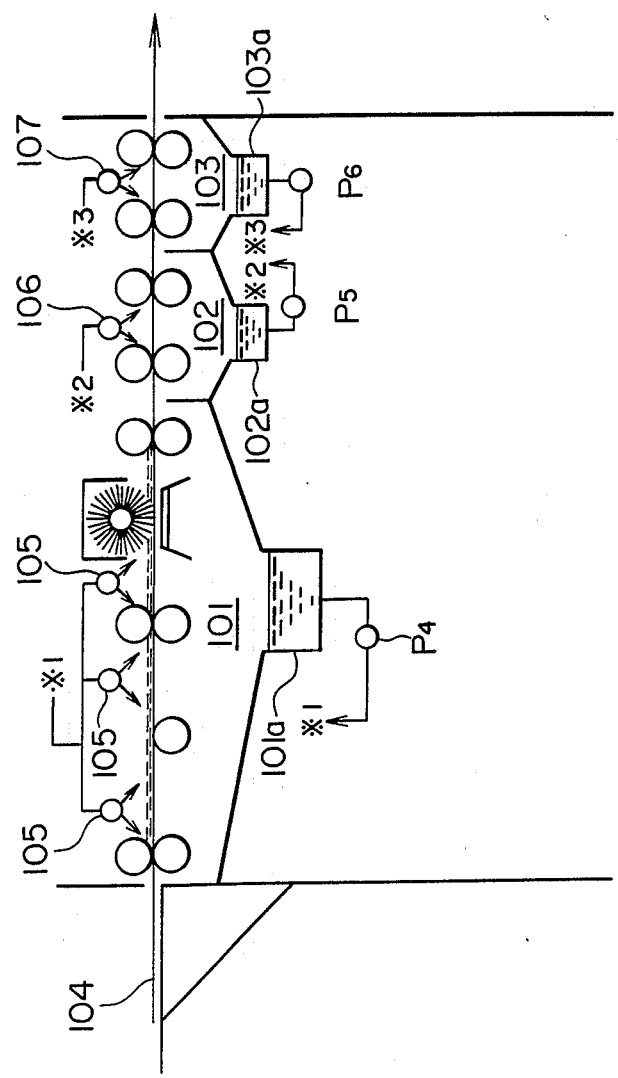
FIGS. 11 and 12 are schematic sectional views of the automatic developing machine used in the examples of the present invention.
Figure 12:
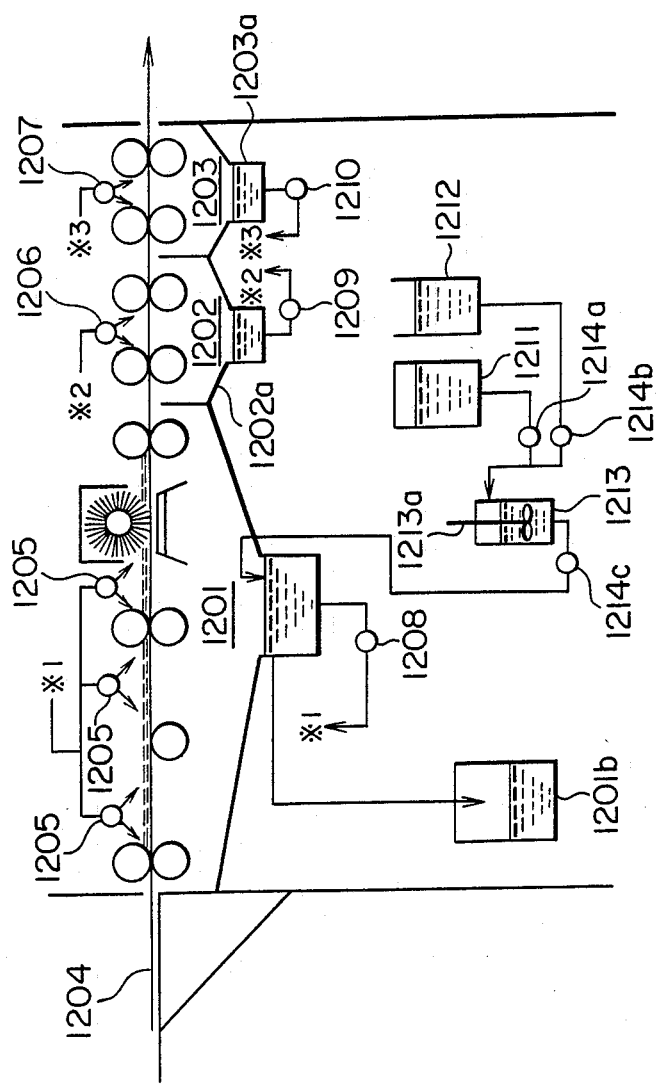
Figure 13:
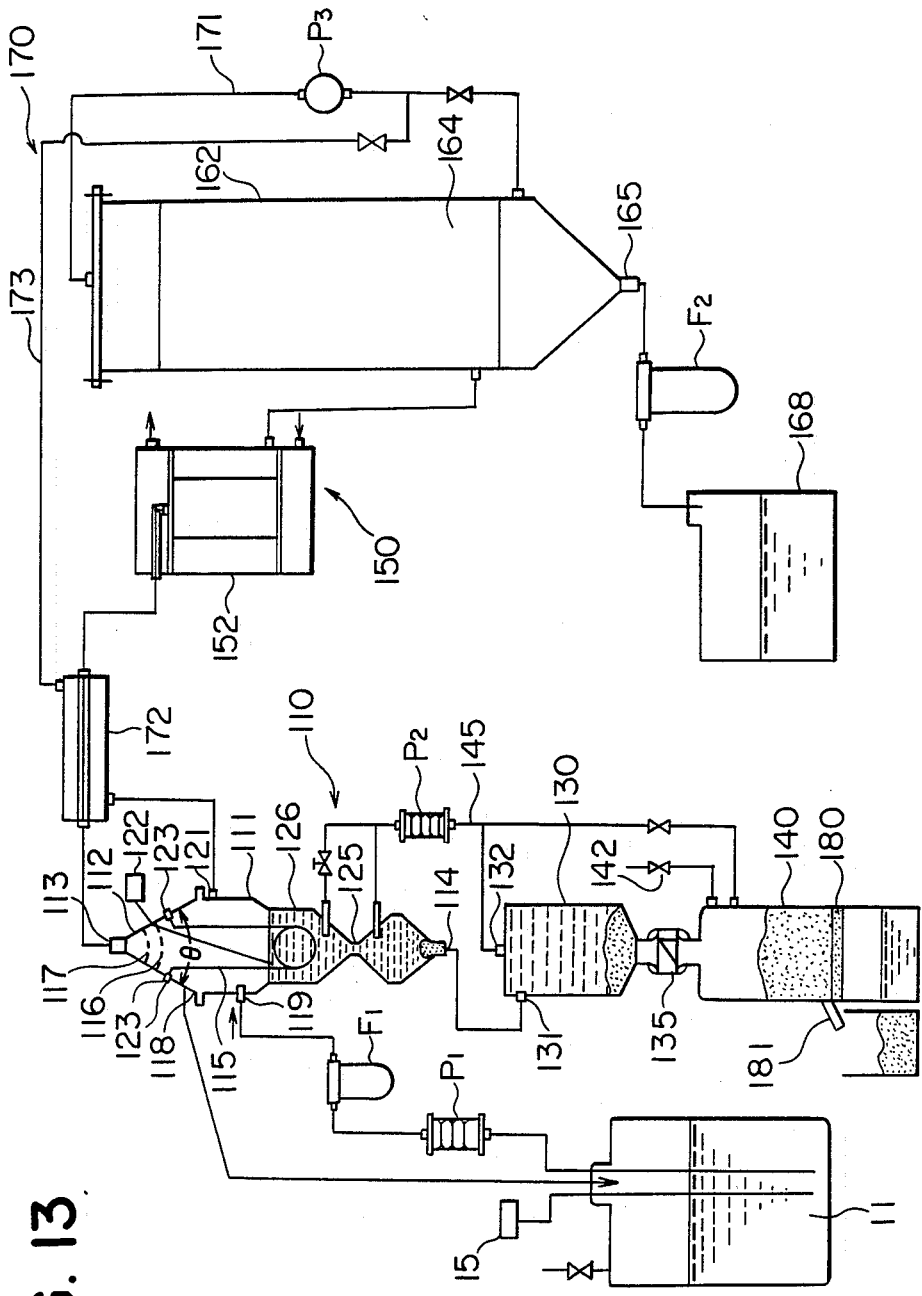
Figure 14:
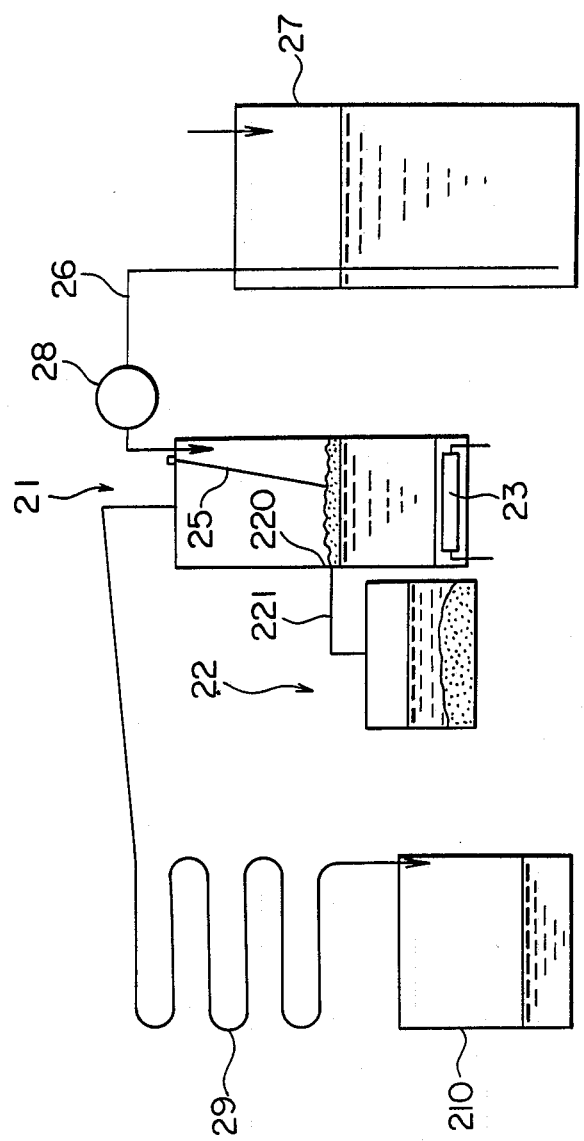

1201, 101 ... Developing section
1201a, 101a ... Developer tank
1201b ... Development waste tank
1202, 102 ... Water-washing section
1202a, 102a ... Washing water tank
1203, 103 ... Rinse/gum section
1203a, 103a ... Rinse/gum liquid tank
1204, ... Light-sensitive lithographic printing plate
1205, 1206, 1207 ... Treating liquid supply nozzle
1208, 1209, 1210 ... Pump
1211 ... Condensed developer tank
1212 ... Diluting water tank
1213 ... Mixing tank
1214a, 1214b, 1214c ... Metering pump

What is claimed is:

1. A method of dividing an aqueous processing waste solution of a non-silver halide light-sensitive material, into a solid and water, said method comprising:
(a) introducing said solution into an evaporator,
(b) concentrating said solution by heating,
(c) removing sludge produced in said evaporator from both the upper surface and bottom of the solution during concentration of said solution by heating,
(d) separating the sludge into said solid and water, and
(e) cooling and condensing evaporated gas to water, wherein said sludge produced in the evaporator is removed from the upper surface of the solution by being made to adhere to at least one floating ball.

2. The method of claim 1, wherein said separating step comprises using a filter.

3. The method of claim 1, wherein said separating step comprises centrifuging.

4. The method of claim 1, wherein said waste solution is a developing waste solution used in developing a presensitized lithographic printing plate comprising at least one compound selected from the group of a diazo compound, an azide compound, a quinone diazide compound and a compound containing an ethylenically unsaturated double bond.

5. The method of claim 1, wherein said waste solution is water used in washing a developed pre-sensitized lithographic printing plate comprising at least one compound selected from the group of a diazo compound, an azide compound, a quinone diazide compound and a compound containing an ethylenically unsaturated double bond.

6. The method of claim 1, wherein said waste solution is rinsing solution used in rinsing a developed presensitized lithographic printing plate comprising at least one compound selected from the group of a diazo compound, an azide compound, a quinone diazide compound and a compound containing an ethylenically unsaturated double bond.

7. The method of claim 1, wherein said waste solution is gum solution used in gumming a developed pre-sensitized lithographic printing Plate comprising at least one compound selected from the group of a diazo compound, an azide compound, a quinone diazide compound and a compound containing an ethylenically unsaturated double bond.

8. The method of claim 1, wherein said water is used as at least a part of washing water and/or water for dilution of at least one selected from concentrated developer, developing replenisher, rinsing solution and gum solution.

9. The method of claim 1, wherein the liquid, separated from the sludge is placed in said evaporator.

10. The method of claim 1, wherein said sludge produced in the evaporator is removed from the evaporator bottom by being made to adhere to a belt or drum.

11. The method of claim 1 wherein said floating ball has a diameter of 5 to 10 mm.

12. The method of claim 1 further comprising the addition of at least one agent selected from the group consisting of an acid, a neutralizing agent, and a coagulant to the solution, before, during, or after concentration of said solution.

13. The method of claim 12, wherein said acid is at least one compound selected from the group of sulfuric acid, hydrochloric acid, phosphoric acid, oxalic acid, citric acid and glutaric acid.

14. The method of claim 12, wherein said neutralizing agent is at least one compound selected from the group of sodium hydroxide, potassium hydroxide, calcium hydroxide and an organic amine.

15. The method of claim 12, wherein said addition comprises adding a coagulant to the solution.

16. The method of claim 15, wherein said coagulant is at least one compound selected from the group of aluminium sulfate, magnesium sulfate, aluminium polychloride, calcium sulfate, magnesium chloride, polyacrylamide typed polymer, polyacrylic acid and polyacrylic acid salt.

17. The method of claim 12, wherein said addition comprises adding a neutralizing agent and a coagulant to the solution.

18. The method of claim 17, wherein said coagulant is added to the solution during or after the addition of a neutralizing agent.

19. The method of claim 12 wherein the pH of the solution is in the range of from 5 to 9 after the addition of an acid.

20. A device for dividing an aqueous processing waste solution of non-silver halide light-sensitive material into solid and water, said device comprising:
    (a) means for introducing said solution into an evaporator,
    (b) means for concentrating said solution by heating,
    (c) means for removing sludge produced in the evaporator, from both the upper surface and bottom of the solution during concentration of said solution by heating,
    (d) means for separating the sludge into said solid and water, and
    (e) means for cooling and condensing evaporated gas to water, wherein said means for removing sludge, produced in the evaporator from the upper surface of the solution comprises at least one floating ball to which the sludge adheres.

21. The device of claim 20, wherein said separating means comprises a filter.

22. The device of claim 20, wherein said separating means comprises a centrifugal.

23. The device of claim 20, wherein said means of removing from the evaporator bottom is a belt or a drum.

24. The device of claim 20, wherein said device further comprises a means of adding at least one selected from the group of an acid, a neutralizing agent and a coagulant.

25. The device of claim 20, wherein said device has a means of supplying said water as at least a part of washing water and/or water for dilution of at least one selected from concentrated developer, developing replenisher, rinsing solution and gum solution.

26. The device of claim 20, wherein said device has a means of placing the liquid, separated from sludge, in the evaporator.

27. The device of claim 20 wherein said ball has a diameter of 5 to 10 mm.

* * * * *